United States Patent
Pedretti et al.

(10) Patent No.: US 12,531,127 B2
(45) Date of Patent: Jan. 20, 2026

(54) COMPACT CAM ARRAY FOR DECISION TREE INFERENCE (TREE-CAM)

(71) Applicant: HEWLETT PACKARD ENTERPRISE DEVELOPMENT LP, Spring, TX (US)

(72) Inventors: Giacomo Pedretti, Cernusco sul Naviglio (IT); Ron M. Roth, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 258 days.

(21) Appl. No.: 18/347,318

(22) Filed: Jul. 5, 2023

(65) Prior Publication Data

US 2024/0249787 A1     Jul. 25, 2024

Related U.S. Application Data

(60) Provisional application No. 63/440,014, filed on Jan. 19, 2023.

(51) Int. Cl.
*G11C 15/04* (2006.01)
*G11C 27/00* (2006.01)

(52) U.S. Cl.
CPC ................................. *G11C 27/005* (2013.01)

(58) Field of Classification Search
None
See application file for complete search history.

(56) References Cited

U.S. PATENT DOCUMENTS

| | | |
|---|---|---|
| 5,283,882 A | 2/1994 | Smith et al. |
| 5,809,528 A | 9/1998 | Miller et al. |
| 8,504,506 B2 | 8/2013 | Narendra et al. |
| 9,479,622 B2 | 10/2016 | Admon et al. |
| 10,847,238 B2 | 11/2020 | Li et al. |
| 10,896,731 B1 | 1/2021 | Li et al. |
| 11,289,162 B2 | 3/2022 | Strachan et al. |
| 2007/0168292 A1 | 7/2007 | Jogand-Coulomb et al. |
| 2015/0254861 A1 | 9/2015 | Chornenky |
| 2022/0138204 A1* | 5/2022 | Graves ................ G11C 27/005 707/694 |

OTHER PUBLICATIONS

Dorogush et al., "CatBoost: gradient boosting with categorical features support", Oct. 24, 2018, 7 pages.

* cited by examiner

*Primary Examiner* — Alfredo Bermudez Lozada
(74) *Attorney, Agent, or Firm* — Dickinson Wright

(57) ABSTRACT

"Tree-CAMs" constructed to implement decision trees more efficiently are provided—namely with less hardware (i.e., fewer memristors and transistors), less power consumption, and less memristor programming time than existing aCAMs used to implement decision trees. A tree-CAM realizes these optimizations by leveraging a shared comparison sub-circuit that stores a threshold shared among evaluable conditions for multiple root-to-leaf-paths of a decision tree. The threshold may be evaluated against a common feature of a feature vector. The shared comparison sub-circuit may comprise just a single memristor programmed to store the threshold. Accordingly, the tree-CAM can represent/implement evaluable conditions (sharing a common threshold and evaluated against a common feature) across multiple root-to-leaf paths of a decision tree using just a single memristor—thus reducing the number of memristors required to implement the decision tree.

20 Claims, 12 Drawing Sheets

FIG. 1 - PRIOR ART -

COMPACT CAM ARRAY FOR DECISION TREE INFERENCE (TREE-CAM)

REFERENCE TO RELATED APPLICATION

The present application claims priority to U.S. Provisional Patent Application No. 63/440,014, filed Jan. 19, 2023, which is incorporated herein by reference in its entirety.

STATEMENT OF GOVERNMENT-FUNDED RESEARCH

This invention was made with government support under Contract No. W911NF2110355 awarded by the Army Research Office. The government has certain rights in the invention.

BACKGROUND

Content addressable memory ("CAM") is a type of computing memory in which stored data is searched by its content rather than its location. When a "word" is input to a CAM, the CAM searches for the word in its contents. If the CAM finds the word (i.e., "returns a match"), the CAM returns the address of the location where the found word resides.

Analog CAMs ("aCAMs") are special types of CAMs that can store and search for ranges of values (in contrast to more traditional digital-based CAMs which can only store/search for zeros and ones) using the programmable conductance of memristors.

Individual aCAM cells can be arranged into aCAM arrays consisting of rows and columns of aCAM cells. Words can be stored along the rows of the aCAM array (the rows of an aCAM array can be referred to as "match lines"), where each aCAM cell of a given row stores an entry of the stored word. When the aCAM array receives an input word (e.g., a series of analog voltage signals each representing an entry of the input word), the aCAM array can search for the input word, by entry, along the columns of the aCAM array (i.e., a first entry of the input word can be searched down a first column of the aCAM array, a second entry of the input word can be searched down a second column of the aCAM array, etc.). The aCAM array will "find" the input word in a given row if all the aCAM cells of the given row return a match for their respective entries of the input word.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
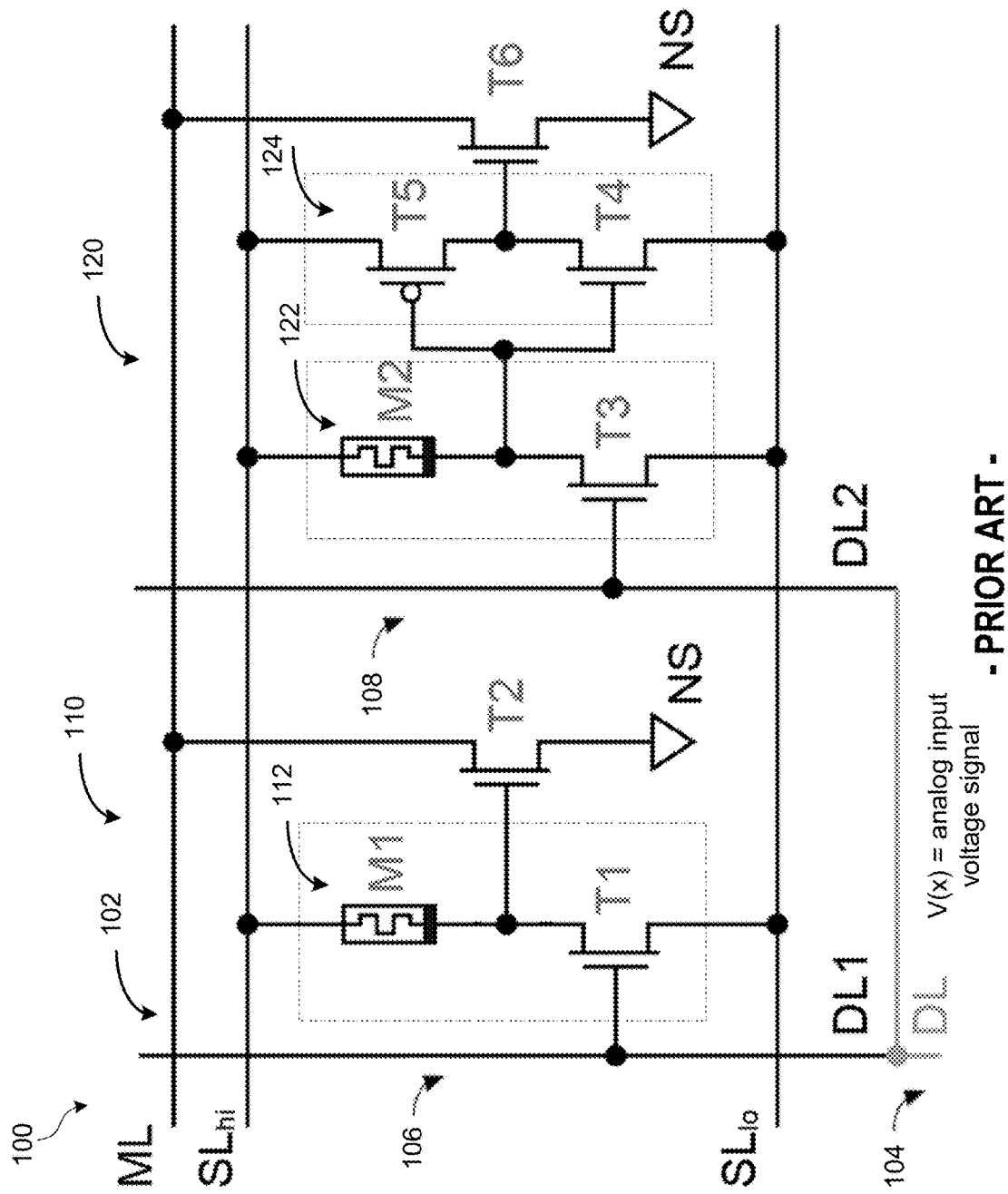
FIG. 1 depicts an example aCAM cell, in accordance with examples of the presently disclosed technology.

The figures are not exhaustive and do not limit the present disclosure to the precise form disclosed.

DETAILED DESCRIPTION

Tree-based models (e.g., random forests, gradient boosted trees, etc.) are popular machine learning models as they are simple to train, perform well with small data sets (especially tabular data sets), and can provide human-interpretable explanations. As used herein, tree-based models may generally be referred to as decision trees.

A decision tree comprises multiple root-to-leaf paths. Each root-to-leaf path represents a traversal of a series of decision nodes. For example, a root-to-leaf path may begin at a root decision node, traverse one or more intermediate decision nodes, and end at a leaf node. Each decision node traversed in the root-to-leaf path may represent an evaluable condition against which a feature of a feature vector may be evaluated. As such, the root-to-leaf path may represent a series of evaluable conditions representative of a logical rule against which the feature vector can be evaluated.

A decision tree can be reformulated for an aCAM implementation by representing each root-leaf-path of the decision tree as a "feature chain" comprising a series of feature chain nodes. A feature chain node may represent one or more evaluable conditions of a root-to-leaf path against which a given feature of a feature vector is evaluated. Decision nodes of a root-to-leaf path associated with a common feature can be combined into a single feature chain node, and features which are not evaluated in the root-to-leaf path can be accounted for using "wildcard" (i.e., "don't care" or "always match") feature chain nodes. Such a representation can be programmed into the rows of an aCAM such that each row of the aCAM represents a different root-to-leaf path of the decision tree. Individual aCAM cells of a row may be programmed to represent individual feature chain nodes associated with a root-to-leaf path (e.g., a first aCAM cell may programmed to represent a first feature chain node against which a first feature of a feature vector is evaluated, a second aCAM cell may programmed to represent a second feature chain node against which a second feature of the feature vector is evaluated, etc.). Accordingly, columns of the aCAM may be associated with respective features of a feature vector being evaluated against the decision tree (e.g., aCAM cells of a first column of the aCAM may be evaluated against a first feature of the feature vector, aCAM cells of a second column of the aCAM may be evaluated against a second feature of the feature vector, etc.). As alluded to above, aCAM cells can be programmed to wildcard values to represent wildcard feature chain nodes which account for features not being evaluated in a given root-to-leaf path. Such aCAM cells may be referred to herein as "non-evaluation cells."

As alluded to above, a feature vector can be applied to root-to-leaf paths stored in an aCAM by applying a series of analog input voltages down the columns of the aCAM (e.g., a first analog input voltage representing a first feature can be applied down a first column of the aCAM, a second analog input voltage representing a second feature can be applied down a second column of the aCAM, etc.). If a first row of the aCAM returns a match, that indicates the feature vector matches a first root-to-leaf path represented by the first row. In certain implementations, leaves of root-to-leaf paths (e.g., classification results) can be programmed into a random access memory (RAM) or a resistive RAM (ReRAM) array connected directly to the match lines of the aCAM.

The above-described representations for decision trees in aCAMs can be extremely sparse because, in general, a given root-to-leaf path for a decision tree will only evaluate a subset of features associated with a feature vector. Accordingly, memristors associated with "non-evaluation cells" (i.e., aCAM cells representing wildcard feature chain nodes associated with features that are not being evaluated for a given root-to-leaf path) are generally programmed to "wildcard" values that always return a match. Relatedly, given a decision tree of depth D, up to $2^D$ values may have to be programmed to an aCAM, many of which being wildcard and/or redundant values. This results in large area and power consumption overhead, and poor utilization of aCAM hardware. Relatedly, reliable memristor programming generally requires several iterations, and thus an increasing number of memristors can lead to an increasing number of programming failures. Accordingly, there is a need for aCAMs that can implement decision trees with greater efficiency.

Against this backdrop, examples of the presently disclosed technology provide aCAMs (referred to herein as "tree-CAMs") specially constructed to implement decision trees more efficiently—namely with less hardware (i.e., fewer memristors and transistors), less power consumption, and less memristor programming time than existing aCAMs used to implement decision trees. A tree-CAM realizes these optimizations by leveraging a "shared" comparison sub-circuit that stores a threshold shared among evaluable conditions for multiple root-to-leaf-paths of a decision tree (here, each root-to-leaf path may be associated with a separate match line of the tree-CAM). The threshold may be evaluated against a common feature of a feature vector. The shared comparison sub-circuit may comprise just a single memristor programmed to store the threshold. Accordingly, the tree-CAM can represent/implement evaluable conditions (sharing a common threshold and evaluated against a common feature) across multiple root-to-leaf paths of a decision tree using just a single memristor—thus reducing the number of memristors required to implement the decision tree. Relatedly, the tree-CAM can eliminate/reduce memristors and other hardware associated with the above-described "non-evaluation cells" that proliferate in existing representations of decision trees in aCAMs (see e.g., FIG. 7B for an example). Accordingly, the tree-CAM can be more compact, consume less power (a significant portion of power consumption for aCAM circuits is associated with memristor programming and its associated circuitry), and require less memristor programming time than existing aCAM circuits used to implement decision trees.

In various examples, a tree-CAM of the presently disclosed technology may comprise: (1) a first match line associated with a first root-to-leaf path of a decision tree; (2) a second match line associated with a second root-to-leaf path of the decision tree; and (3) a shared comparison sub-circuit comprising a (single) memristor. The shared comparison sub-circuit may operate to: (a) store a boundary voltage threshold based on a programmed conductance of the memristor, the boundary voltage threshold associated with one or more evaluable conditions involving a feature of a feature vector; (b) receive an analog input voltage corresponding to the feature; and (c) output a comparison output voltage that comprises a first voltage when the analog input voltage exceeds the stored boundary voltage threshold and a second voltage when the analog input voltage is less than the stored boundary voltage threshold. The tree-CAM may further comprise: (1) a first match line transistor that selectively modifies voltage of the first match line based on the comparison output voltage (e.g., only modifies voltage of the first match line when the comparison sub-circuit comprises the second voltage); and (2) a second match line transistor that selectively modifies voltage of the second match line based on the comparison output voltage (e.g., only modifies voltage of the second match line when the comparison sub-circuit comprises the first voltage). Accordingly (and as alluded to above), the tree-CAM can represent/implement evaluable conditions (sharing a common threshold and evaluated against a common feature) across multiple root-to-leaf paths of the decision tree using just the (single) memristor.

In certain examples, the tree-CAM may comprise a third match line associated with a third root-to-leaf path of the decision tree. Here, the first and second root-to-leaf paths may include evaluable conditions involving the feature, while the third root-to-leaf path does not. Accordingly, among the first-third match lines, only the first and second match lines may be electrically connected to the shared comparison sub-circuit via match line transistors. As described in greater detail below, through this elegant mechanism, the tree-CAM can realize further reductions in footprint, hardware, power consumption, programming time and failures, etc.

For concept illustration (and as will be described in greater detail below), a conventional aCAM representation—comprising 6 transistor-2 memristor aCAM cells—would represent the above-described decision tree segment using: (1) a first aCAM cell electrically connected to the first match line; (2) a second aCAM cell electrically connected to the second match line; and (3) a third aCAM cell electrically connected to the third match line. The first-third aCAM cells would typically be in the same column of an aCAM, and would be evaluated against the feature of the feature vector applied to the aCAM. Here, the first aCAM cell would be programmed to store a first feature chain node (i.e., a feature chain node associated with the first root-to-leaf path), the second aCAM cell would be programmed to store a second feature chain node (i.e., a feature chain node associated with the second root-to-leaf path), and the third aCAM cell would be programmed to store a third "wildcard" feature chain node using wildcard values that always return a match (as alluded to above, the third aCAM cell may be referred to as a "non-evaluation" cell). Typically, conductance of one memristor of the first aCAM cell would be programmed such that the first aCAM cell stores the boundary voltage threshold stored by the shared comparison sub-circuit of the above-described tree-CAM (here, the first aCAM cell may store the boundary voltage threshold as either an upper boundary or a lower boundary). Conductance of a second memristor of the first aCAM cell would be programmed to a wildcard value. Similarly, conductance of one memristor of the second aCAM cell would be programmed such that the second aCAM cell stores the boundary voltage threshold stored by the shared comparison sub-circuit of the above-described tree-CAM (again, the second aCAM cell may store the boundary voltage threshold as either an upper boundary or a lower boundary). Conductance of a second memristor of the first aCAM cell would be programmed to a wildcard value. As alluded to above, both memristors of the third aCAM cell would be programmed to wildcard values. Accordingly, the conventional aCAM representation would utilize 18 transistors and 6 memristors to store the above-described decision tree segment (i.e., (6 transistors and 2 memristors)×(3 aCAM cells)). By contrast, the tree-CAM can implement such a representation with just a single memristor, and as few as three transistors (e.g., as few as one transistor used to implement the shared comparison sub-circuit, the first match line transistor, and the second match line transistor). Accordingly, the tree-CAM can realize significant reductions in footprint, hardware, power consumption, memristor programming time and failures, etc.

Figure 7A:
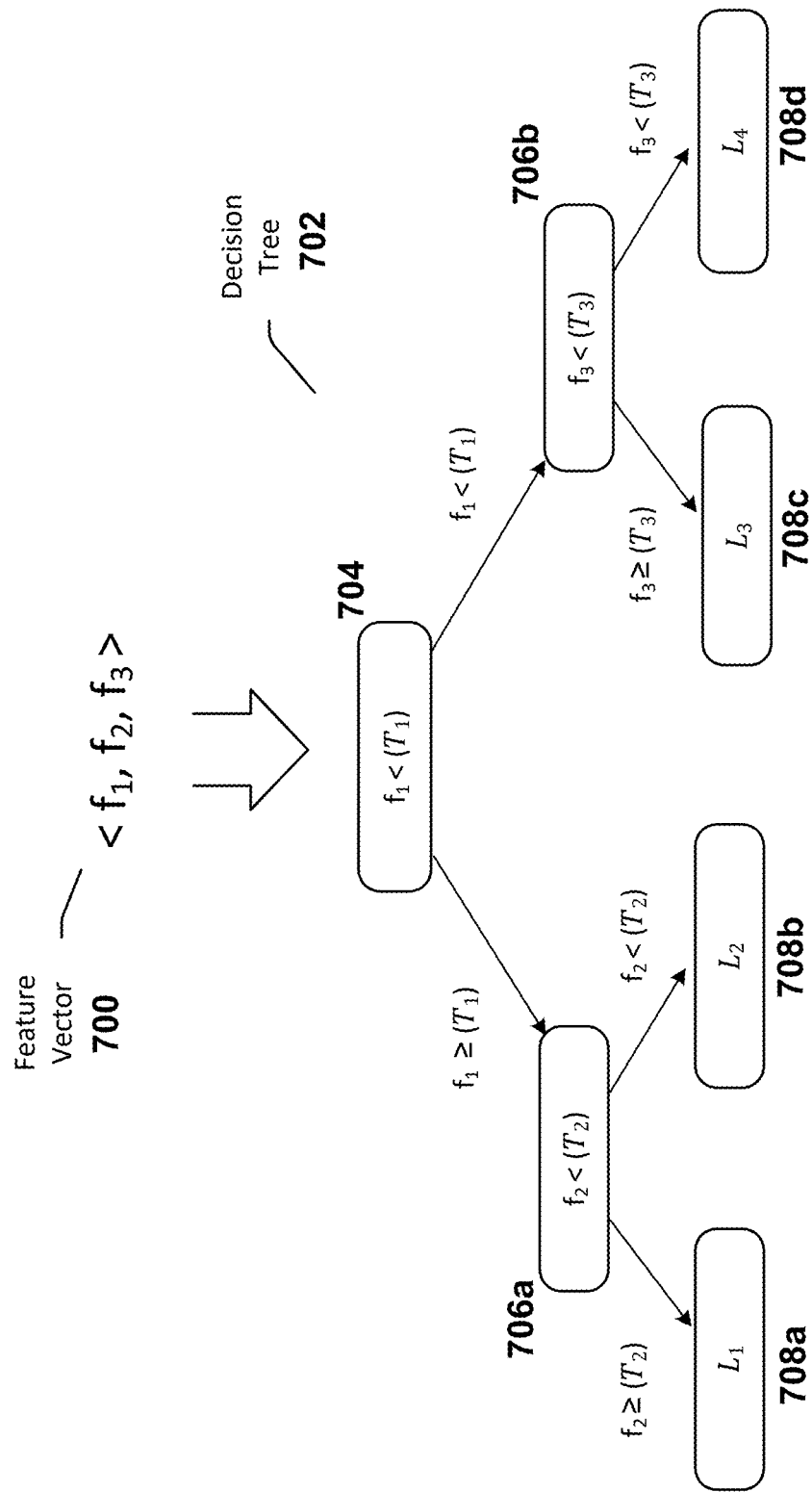
FIGS. 7A-7C respectively depict an example decision tree, an example representation of the decision tree in an aCAM, and an example representation of the decision tree in a tree-CAM, in accordance with examples of the presently disclosed technology.
Figure 7B:
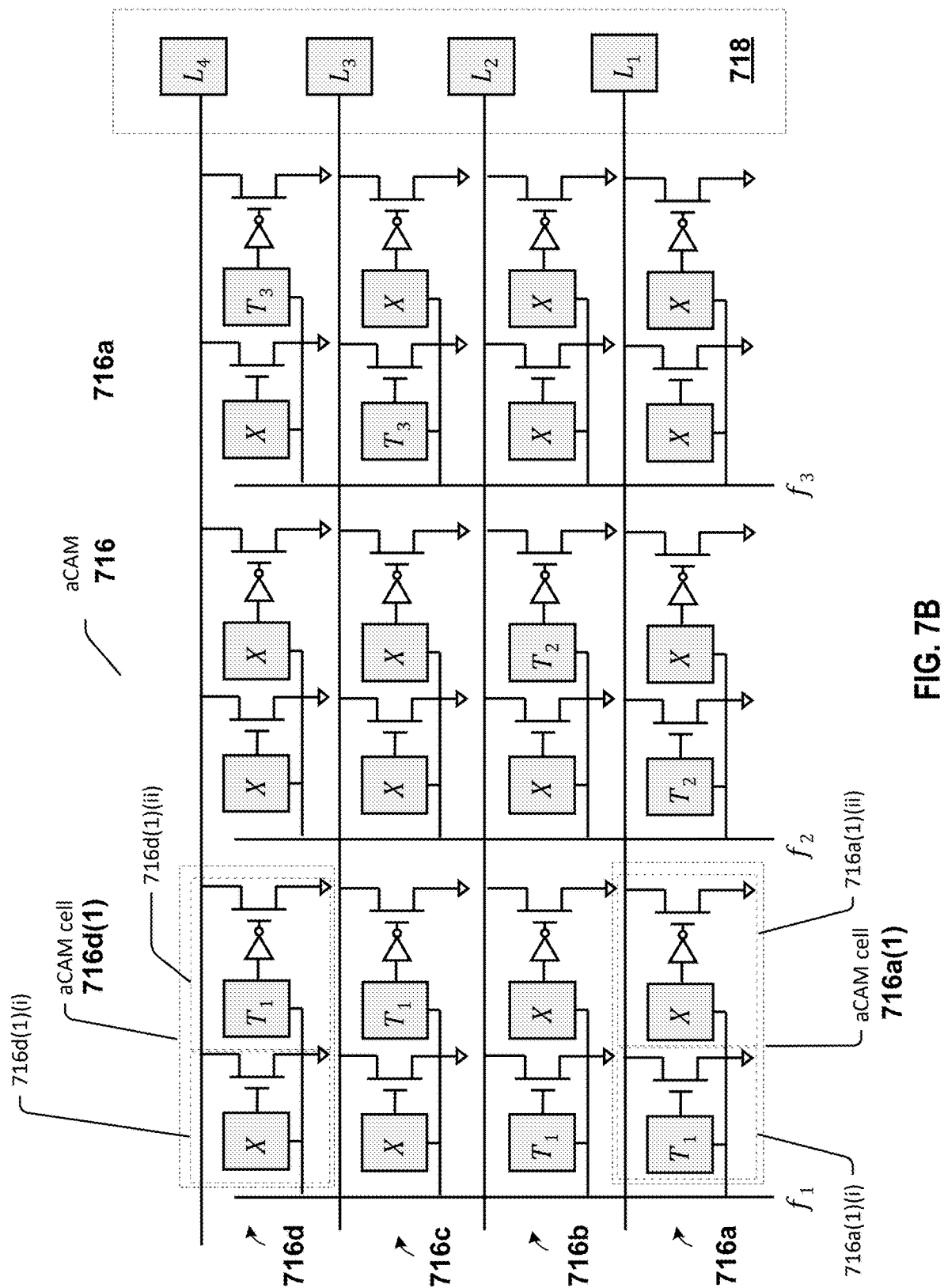
Figure 7C:
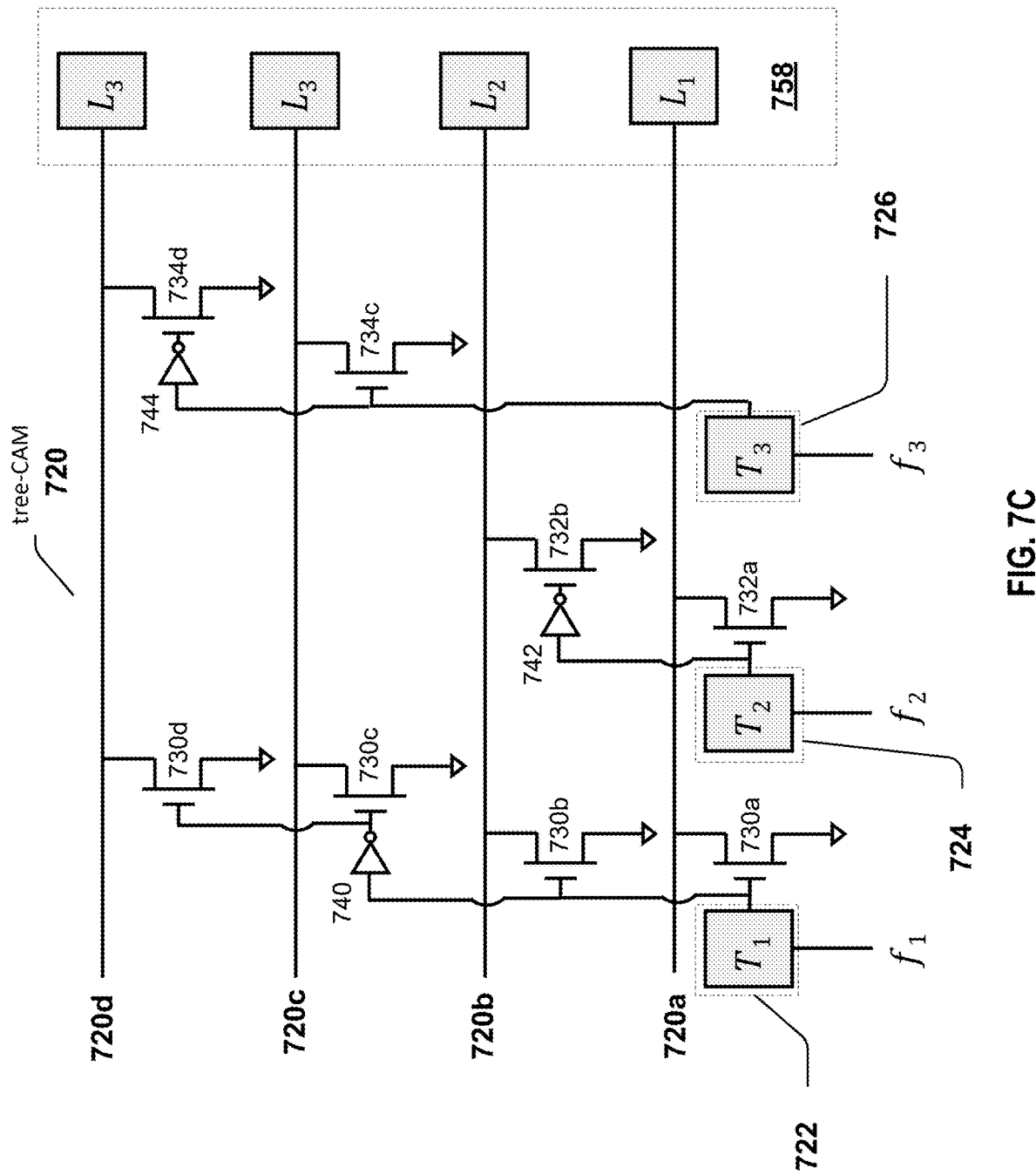
Figure 8A:
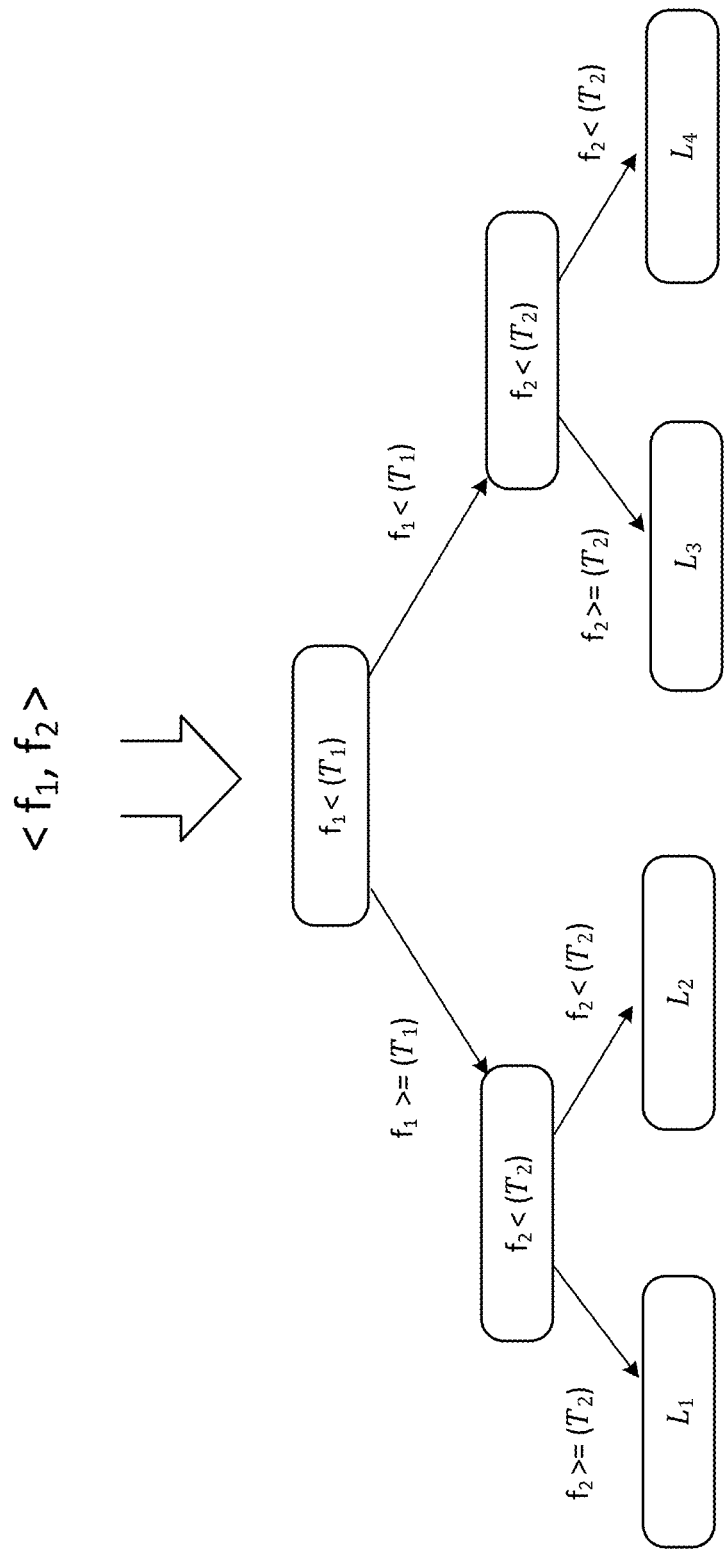
FIGS. 8A-8B respectively depict an example decision tree and an example representation of the decision tree in a tree-CAM, in accordance with examples of the presently disclosed technology.
Figure 8B:
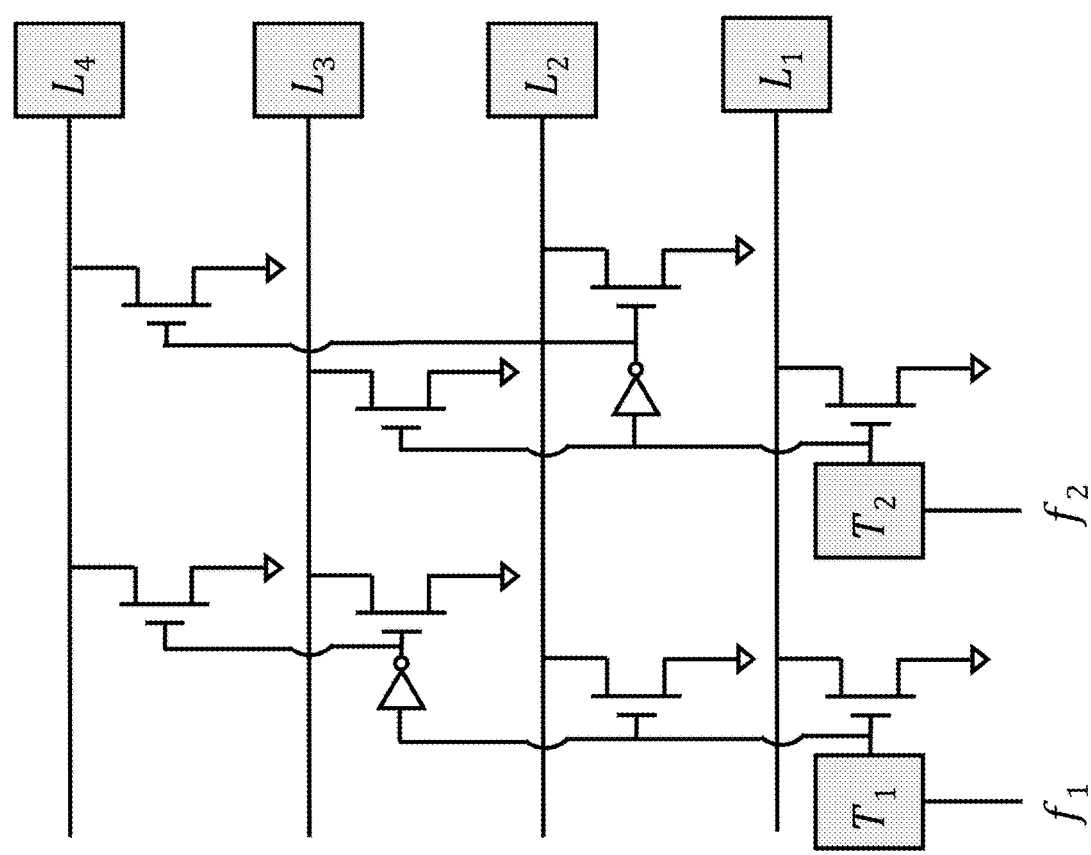
Figure 9:
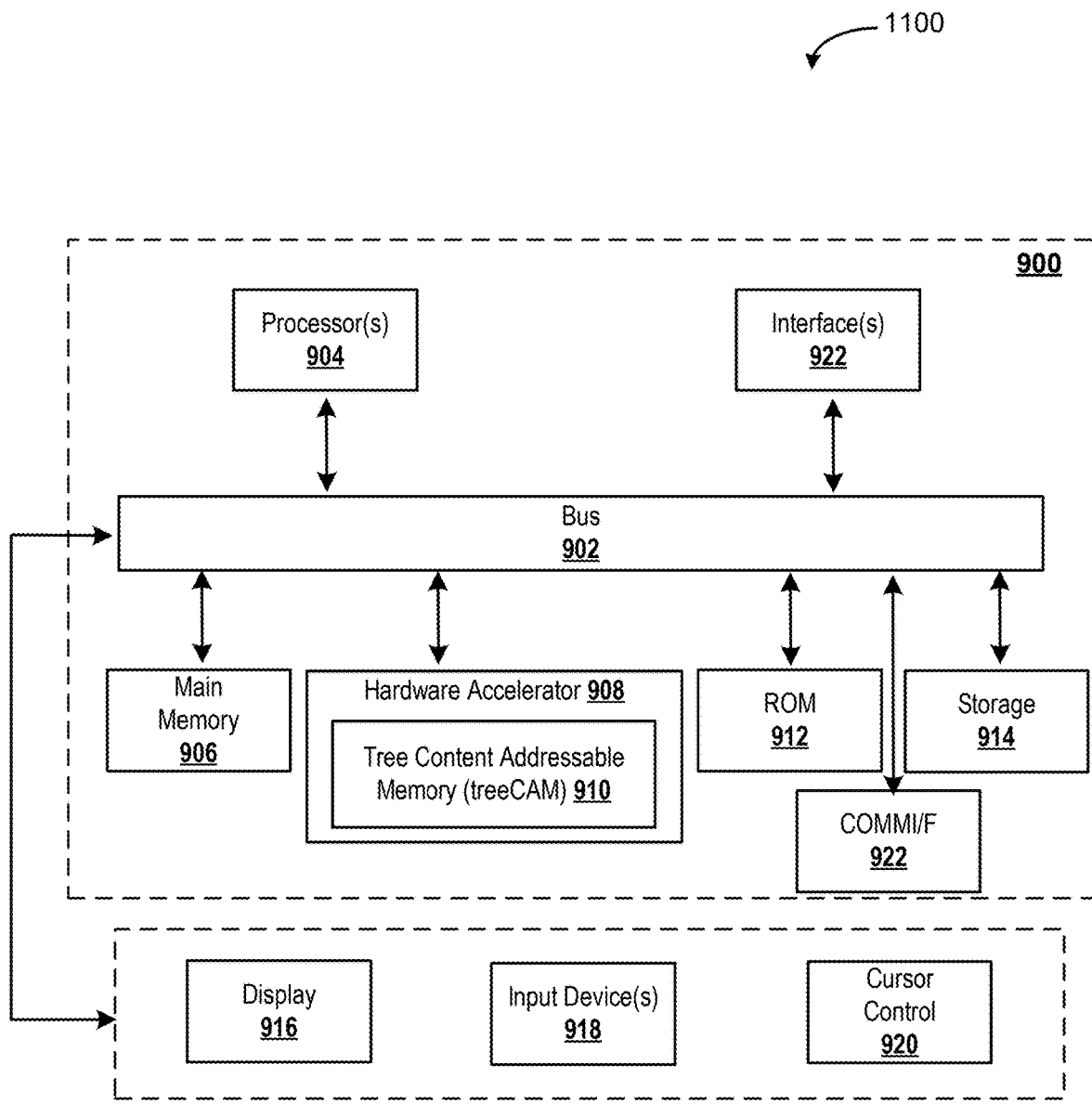
FIG. 9 depicts a block diagram of an example computer system in which various of the examples described herein may be implemented.

Examples of the present technology will be described in greater detail in conjunction with the following FIGs. Namely, FIGS. 1-6 describe general background that may be helpful for appreciating the advantages provided by tree-CAMs of the presently disclosed technology over conventional representations for decision trees in aCAMs. FIGS. 7A-7C illustrate a comparison between a conventional representation for a decision tree in an aCAM and a representation for the decision tree using a tree-CAM of the presently disclosed technology. FIGS. 8A-8B illustrate another representation of a decision tree using a tree-CAM of the presently disclosed technology. FIG. 9 depicts a block diagram of an example computer system in which various of the examples described herein may be implemented.

Referring now to FIG. 1, FIG. 1 depicts an example conventional aCAM cell 100. aCAM cell 100 may be an example of a 6 transistor-2 memristor (6T2M) aCAM cell conventionally used to represent decision trees in aCAMs.

aCAM cell 100 is electrically connected to a match line (i.e., ML 102) that may be pre-charged to a high voltage. aCAM cell 100 may "return a match" when the voltage across ML 102 remains high, and "return a mismatch" when the voltage across ML 102 is discharged. As described above, aCAM cell 100 may be an aCAM cell in a row of an aCAM. In certain examples, the match/mismatch result for the entire row (of which aCAM cell 100 is a part) may be output to another circuit (e.g., a resistive random access memory array (reRAM)) for further processing/classification.

aCAM cell 100 also includes two data lines: DL1 106 and DL2 108 (running vertically in the example of FIG. 1) that are both electrically connected to an input data line: DL 104. aCAM cell 100 may receive an analog input voltage signal (V(x)) along DL 104 (here, analog input voltage signal (V(x)) may be an analog voltage signal that was converted from a digital input signal (x)). As depicted, DL1 106 and DL2 108 are both electrically connected to DL 104, and are electrically connected in parallel with respect to each other. Accordingly, analog input voltage signal (V(x)) may be applied along DL1 106 and DL2 108 respectively. As alluded to above, analog input voltage signal (V(x)) will eventually discharge ML 102 if analog input voltage signal (V(x)) is outside of the analog voltage range programmed in aCAM cell 100. Here, the analog voltage range stored by aCAM cell 100 is set/defined by programmed conductances of memristors M1 and M2, where the programmed conductance of memristor M1 sets/defines the lower bound of the stored analog voltage range and the programmed conductance of memristor M2 sets/defines the upper bound of the stored analog voltage range (see e.g., FIG. 2).

As depicted, aCAM cell 100 includes a "lower bound side" 110 and an "upper bound side" 120, so-called because memristors M1 and M2 are programmed to set the lower bound and the upper bound of the analog voltage range stored by aCAM cell 100, respectively.

Lower bound side 110 includes a transistor T1 and memristor M1 electrically connected to each other in series. Memristor M1, in conjunction with transistor T1, define a voltage divider sub-circuit 112. As depicted, voltage divider sub-circuit 112 generates a gate voltage (G1) across pull-down transistor T2. When the gate voltage (G1) across pull-down transistor T2 exceeds a threshold value, pull-down transistor T2 will turn on/activate and "pull-down" (i.e., discharge) the voltage across ML 102, returning a mismatch. As described above, the voltage across pull-down transistor T2 can be influenced by: (1) the programmed conductance of memristor M1; and (2) analog input voltage signal (V(x)). In particular, when analog input voltage signal (V(x)) is greater than or equal to a threshold voltage (e.g., (TL)), transistor T1 will become more conductive (the programmed conductance of memristor M1 will remain the same during the search operation) and thus the voltage between SL_hi and SL_lo (typically at ground (GND)) will drop across memristor M1, resulting in a small gate voltage (G1) that does not turn on/activate pull-down transistor T2, yielding a match result for lower bound side 110. Here, the value of (TL) (i.e., the threshold voltage that will cause transistor T1 to become more conductive relative to memristor M1) can be programmed by programming the conductance of memristor M1. In this way, the programmed conductance of memristor M1 can be used to set the lower bound of the voltage range stored by aCAM cell 100.

Similar to lower bound side 110, upper bound side 120 includes a transistor T3 and memristor M2 electrically connected to each other in series. Memristor M2, in conjunction with the transistor T3, define a voltage divider sub-circuit 122. Upper bound side 120 differs slightly from lower bound side 110 because voltage divider sub-circuit 122 is electrically connected to an input of an inverter 124 (here the series combination of transistors T4 and T5 operate in conjunction to comprise inverter 124). Inverter 124 operates to invert the voltage output by voltage divider sub-circuit 122. Because pull-down transistor T6 is electrically connected to the output of inverter 124, the inverted voltage output by inverter 124 controls the gate voltage (G2) across pull-down transistor T6. Similar to above, when the gate voltage (G2) across pull-down transistor T6 exceeds a threshold value, pull-down transistor T6 will turn on/activate and "pull-down" (i.e., discharge) the voltage across ML 102, returning a mismatch. As described above, the voltage across pull-down transistor T6 can be influenced by: (1) the programmed conductance of memristor M2; and (2) analog input voltage signal (V(x)). In particular, when analog input voltage signal (V(x)) is less than or equal to a threshold voltage (e.g., (TH)), transistor T3 will not be highly conductive (e.g., have a conductance on the order of 10 nS as compared to a higher conductance state of e.g., 10 mS) and thus the voltage between SL_hi and SL_lo (typically at GND) will remain high across transistor T3, resulting in a high voltage output for voltage divider sub-circuit 122. However, when this high voltage is inverted by inverter 124, the inverted (now low) voltage causes a low gate voltage (G2) that does not turn on/activate pull-down transistor T6, thus yielding a match result for upper bound side 120. Here, the value of (TH) (i.e., the threshold voltage that will cause transistor T3 to not be highly conductive relative to memristor M2) can be programmed by programming the conductance of memristor M2. In this way, the programmed the conductance of memristor M2 can be used to set the upper bound of the voltage range stored by aCAM cell 100.

As alluded to above (and as will be described in greater detail in conjunction with FIG. 3), either or both of M1 and M2 may be programmed to wildcard values. If both M1 and M2 are programmed to wildcard values, aCAM cell 100 will practically always return a match. If only M1 is programmed to a wildcard value, aCAM cell 100 will essentially/practically only store an upper boundary voltage threshold. Conversely, if only M2 is programmed to a wildcard value, aCAM cell 100 will essentially/practically only store a lower boundary voltage threshold.

Figure 2:
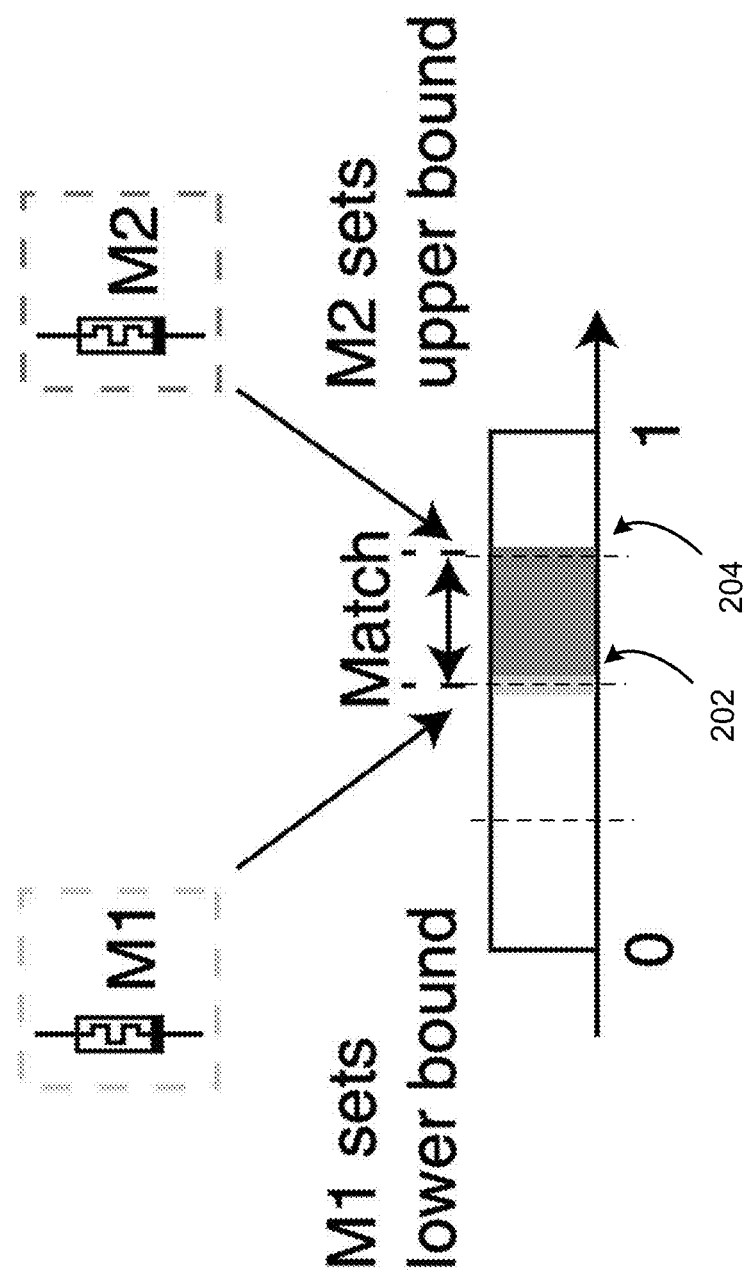
FIG. 2 depicts an example voltage range diagram, in accordance with examples of the presently disclosed technology.

FIG. 2 depicts an example diagram that illustrates how memristors M1 and M2 from aCAM cell 100 can be used to set a lower boundary voltage 202 and an upper boundary voltage 204 of a stored voltage range for aCAM cell 100. As depicted, aCAM cell 100 will return a match for an analog input voltage signal (V(x)) when analog input voltage signal (V(x)) is within the voltage range defined by lower boundary voltage 202 and upper boundary voltage 204. When analog input voltage signal (V(x)) is outside the voltage range defined by lower boundary voltage 202 and upper boundary voltage 204, aCAM cell 100 will return a mismatch. As described above, the conductance of memristors M1 and M2 respectively can be programmed to set/define lower boundary voltage 202 and upper boundary voltage 204.

Figure 3:
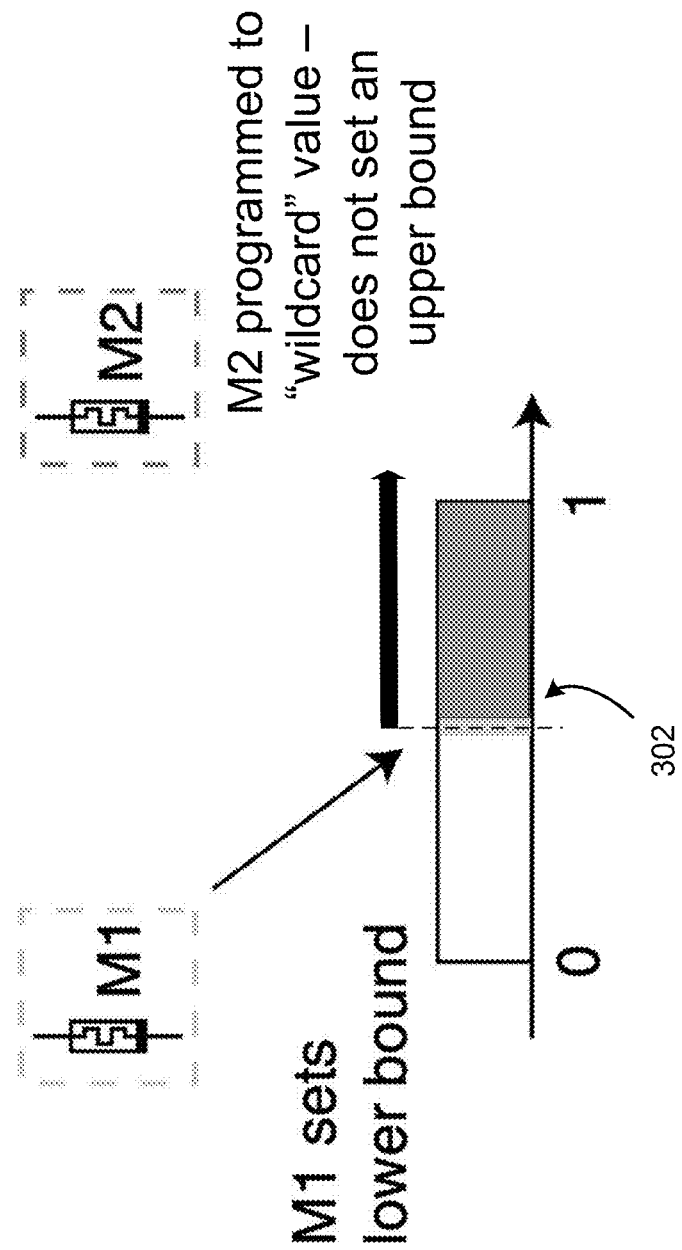
FIG. 3 depicts another example voltage range diagram, in accordance with examples of the presently disclosed technology.

FIG. 3 depicts an example diagram that illustrates how memristors M1 and M2 from aCAM cell 100 can be programmed to store an open-ended voltage range for aCAM cell 100 (i.e., a stored voltage range that is practically un-bounded on at least one end). As depicted, aCAM cell 100 will return a match for an analog input voltage signal (V(x)) whenever analog input voltage signal (V(x)) is greater than or equal to a lower boundary voltage 302 set by memristor M1. In other words, aCAM cell 100 will only return a mismatch when analog input voltage signal (V(x)) is less than lower boundary voltage 302. As described above, the conductance of memristor M1 can be programmed to set lower boundary voltage 302.

Here, FIG. 3 differs from FIG. 2 because the conductance of memristor M2 has been programmed to a "wildcard" value (sometimes referred to as a "don't care" value) that practically always returns a match for the upper boundary side 120 of aCAM cell 100 (i.e., returns a match for the upper boundary side 120 of aCAM cell 100 for any value of analog input voltage signal (V(x)) that would be received by aCAM cell 100 in practice). In general, deep conductance states of memristors can be used as wildcard values that practically set open-ended lower and upper boundaries for an aCAM cell. These deep conductance states (e.g., a deep low conductance state (DLCS) for a lower boundary wildcard value and a deep high conductance state (DHCS) for an upper boundary wildcard value) will be far outside the reliably programmable conductance ranges of the memristors. For example, if the memristors of aCAM cell 100 are programmed in the range [1 uS, 100 uS], deep conductance states of e.g., 0.01 uS and 1000 uS can be used for wildcard values that practically set open-ended lower and upper boundaries for aCAM cell 100 respectively. These deep conductance states are typically difficult to program in a reliable way, and are thus reserved for wildcard values where an error of e.g., 10% in programming can be acceptable. By programming memristors of aCAM cell 100 to wildcard values/deep conductance states, examples can set deep state lower and upper voltage boundaries that are practically open-ended. In other words, because in practice input/search voltage values received by an aCAM cell/sub-circuit will generally always be within the deep state lower and upper voltage boundaries set by programming memristors of an aCAM cell/sub-circuit to wildcard values, it can be generally stated that programmed wildcard values will always return a match.

Thus, in FIG. 3, memristor M2 practically sets an open-ended "upper boundary" for the analog voltage range stored by aCAM cell 100. It should be understood that in other examples, the conductance of memristor M2 may be programmed to set a "true" upper boundary voltage (i.e., an upper boundary voltage that that practically defines a "less than or equal to" condition at the upper boundary), and the conductance of memristor M1 may be programmed to a "wildcard" value that practically always returns a match for the lower boundary side 110 of aCAM cell 100 (i.e., such programming may practically store an open-ended voltage range that is only practically bounded at the upper end). Similarly, in certain examples the conductances of both memristors M1 and M2 may be programmed to "wildcard" values such that aCAM cell 100 practically always returns a match (i.e., returns a match for any value of analog input voltage signal (V(x)) that aCAM cell 100 would receive in practice).

As alluded to above, aCAM cells can be programmed to wildcard values to represent features not being evaluated in a root-to-leaf path. Such aCAM cells may be referred to herein as "non-evaluation cells."

Figure 4:
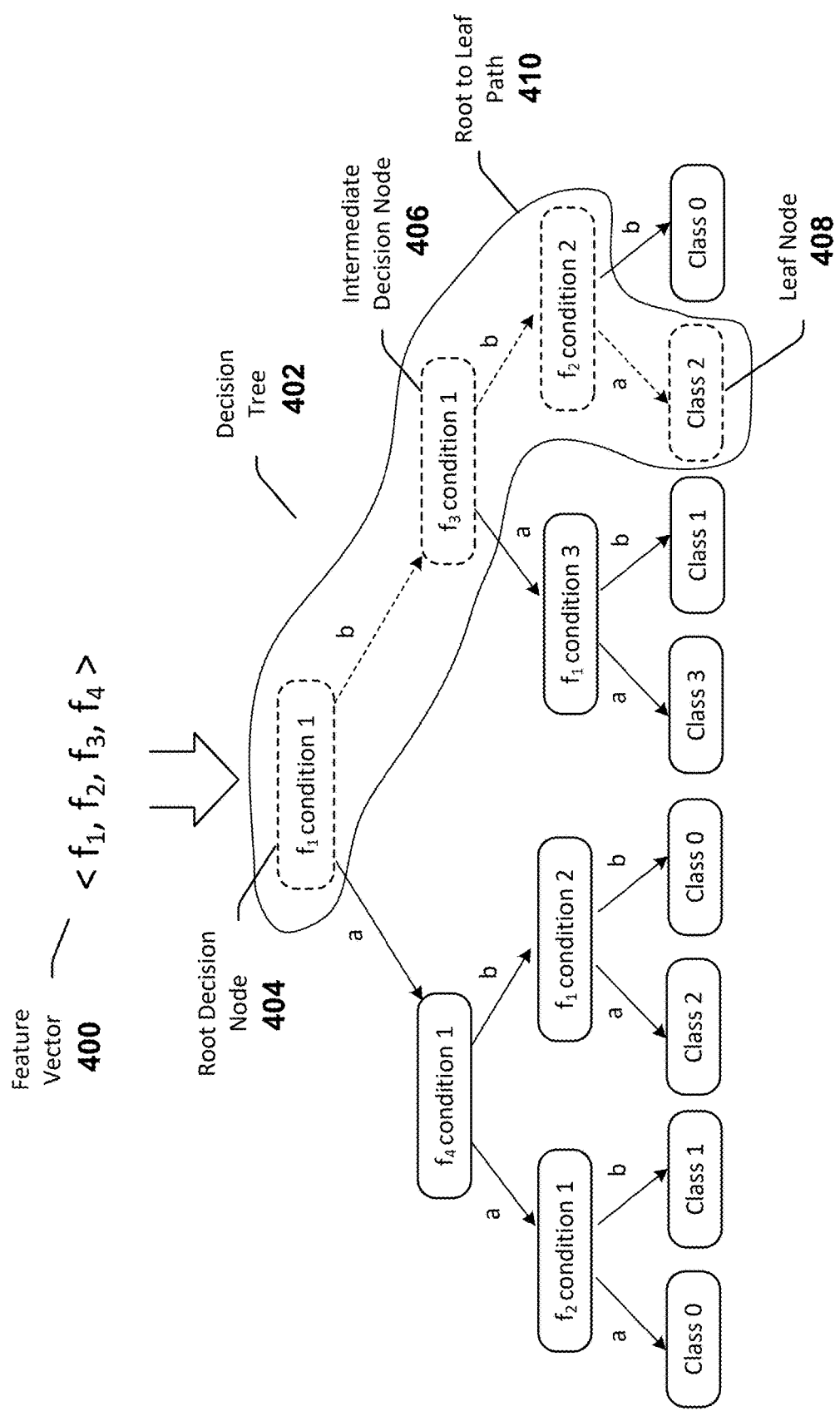
FIG. 4 depicts an example decision tree, in accordance with examples of the presently disclosed technology.
Figure 5:
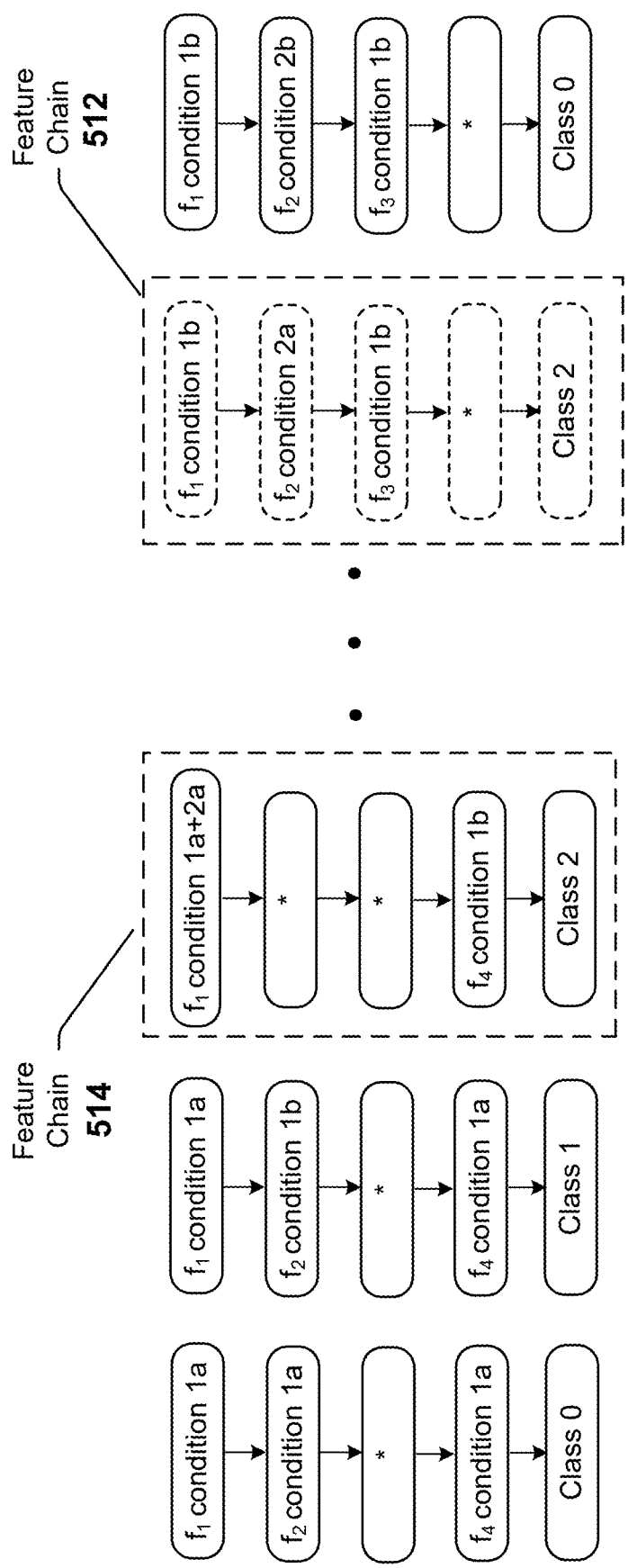
FIG. 5 depicts example feature chains, in accordance with examples of the presently disclosed technology.
Figure 6:
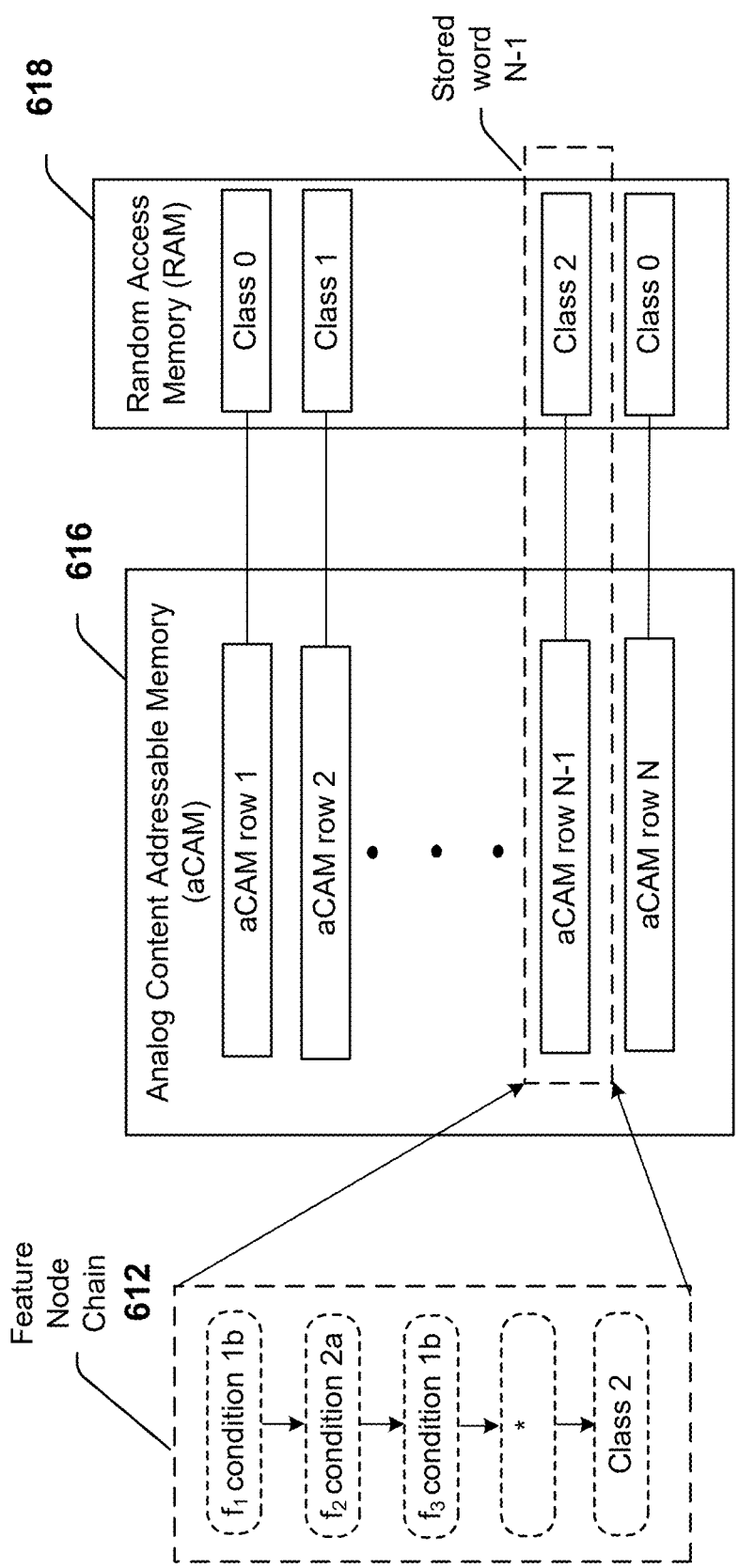
FIG. 6 depicts an example representation of a decision tree in an aCAM, in accordance with examples of the presently disclosed technology.

FIGS. 4-6 illustrate how an example decision tree 402 can be represented in an aCAM. The methodology described in conjunction with FIGS. 4-6 may be an example a conventional methodology/representation of a decision tree in an aCAM.

As depicted in FIG. 4, decision tree 402 may include a set of decision nodes including root decision node 404, various intermediate decision nodes (e.g., intermediate decision node 406), and various leaf nodes (e.g., leaf node 408) that represent terminus points of decision tree 402. It should be appreciated that decision tree 402 is merely an illustrative implementation of a decision tree.

Decision tree 402 may include multiple root-to-leaf paths. Each root-to-leaf path represents a traversal of a series of decision nodes. For example, a root-to-leaf path may begin at root decision node 404, traverse one or more intermediate decision nodes, and end at a leaf node. Each decision node traversed in the root-to-leaf path may represent an evaluable condition against which a feature of feature vector 400 may be evaluated. As such, the root-to-leaf path represents a series of evaluable conditions representative of a logical rule against which feature vector 400 can be evaluated.

In example root-to-leaf path 410 shown in FIG. 4, the series of evaluable conditions may begin with the condition evaluated at root decision node 404, which is illustratively depicted as involving feature $f_1$ of feature vector 400. In the example decision tree 402, evaluating the condition represented by any given decision node may result in one of two possible outcomes, labeled as outcome "a" and outcome "b." In some examples, outcome "b" represents the condition not being satisfied when evaluated and outcome "a" represents the condition being satisfied when evaluated. For instance, if the evaluable condition at the root node 404 is whether $f_1$ is less than a value $x_1$, outcome "b" may represent a negative determination (i.e., $f_1 \geq x_1$) and outcome "a" may represent a positive determination (i.e., $f_1 < x_1$). It should be appreciated that in other implementations more than two outcomes may be possible for an evaluable condition associated with a decision node.

In example root-to-leaf path 410, the outcome of the determination at the root decision node 404 is illustratively depicted as outcome "b," which indicates that the condition evaluated at root decision node 404 involving feature $f_1$ is not satisfied. Based on this outcome, root-to-leaf path 410 transitions from root decision node 404 to intermediate decision node 406. Transitions from a first decision node to a second decision node within a given root-to-leaf path are represented as a combination of the condition evaluated at the first decision node and the outcome of that evaluation. For instance, the transition from root decision node 404 to intermediate decision node 406 in the example root-to-leaf path 410 is represented as $f_1$ condition 1b. Using this convention, the example root-to-leaf path 410 can be represented by the following decision node transitions: $f_1$ condition 1b to $f_3$ condition 1b to $f_2$ condition 2a to Class 2. Each other root-to-leaf path in decision tree 402 may be similarly represented as a series of decision node transitions indicative of the condition evaluated at each decision node in combination with the outcome of that evaluation.

In various examples, the information contained in decision tree 402 may be converted to an alternate representation such as a tabular representation. In particular, each root-to-leaf path in decision tree 402 may be represented as a corresponding column in the tabular representation, referred to herein as a "feature chain" and illustrated in FIG. 5. For example, a decision tree can be reformulated for an aCAM implementation by: reformulating the decision tree to represent each root-to-leaf path as a feature chain with a series of feature chain nodes; combining multiple evaluable conditions of a root-to-leaf path involving an individual feature into one feature chain node; adding "wildcard" feature chain nodes to account for features not evaluated in a root-to-leaf path; and rotating (i.e., matrix transforming) the representation and mapping each feature chain to each row in the aCAM such that the columns of the aCAM correspond with feature vectors.

For instance, example root-to-leaf path 410 illustrated in FIG. 4 may be converted to feature chain 512. Feature chain nodes in feature chain 512 may correspond to one or more decision node transitions in the corresponding root-to-leaf path 410. More specifically, each feature chain node in feature chain 512 corresponds to a respective feature in feature vector 400. Because feature vector 400 is illustratively depicted as including four features ($f_1$, $f_2$, $f_3$, $f_4$), each feature chain associated with decision tree 402 may include four feature chain nodes corresponding to the four features, as well as a leaf node representing the leaf node of the corresponding root-to-leaf path. It should be appreciated that feature vector 400 may contain any number of features, in which case, corresponding feature chains may include a corresponding number of feature chain nodes along with a leaf node. In some examples, the leaf nodes may also correspond to a feature (e.g., an optimized parameter) that forms part of feature vector 400.

As alluded to above, certain root-to-leaf paths may not include evaluable conditions for one or more features. For instance, root-to-leaf path 410 does not include an evaluable condition for feature $f_4$. Accordingly, "wildcard" feature chain nodes (i.e., feature chain nodes comprising wildcard values) may be included to account for features that are not involved in any evaluable condition of a given root-to-leaf path. Feature chain 512 includes such a wildcard feature chain node for feature $f_4$ as root-to-leaf path 410 (corresponding with feature chain 512) does not include an evaluable condition involving feature $f_4$. This means that any value specified for feature $f_4$ in a search query would result in a match with respect to feature $f_4$ when evaluated against feature chain 512 after it has been encoded in an aCAM.

In connection with converting the representation of the set of domain logic rules from decision tree 402 to the tabular representation, decision nodes within a given root-to-leaf path may be consolidated and/or reordered when determining the sequence of corresponding feature chain nodes in the feature chain that represents the root-to-leaf path. For instance, an evaluable condition involving feature $f_3$ occurs before an evaluable condition involving feature $f_2$ in the sequence of decision nodes traversed as part of root-to-leaf path 410. However, prior to encoding feature chain 512 in an aCAM, the sequence of evaluable conditions represented by root-to-leaf path 410 may be reordered to ensure that the sequence of the evaluable conditions in the corresponding feature chain 512 matches the sequence of features in feature vector 400. This reordering may occur, as needed, for each root-to-leaf path in decision tree 402 as part of converting the root-to-leaf path to a corresponding feature chain in the tabular representation.

For example, each feature chain in the tabular representation (e.g., each column in a table) may begin with a feature chain node representing an evaluable condition involving feature $f_1$ in the corresponding root-to-leaf path, followed by an evaluable condition involving feature $f_2$, and so on until the penultimate feature chain node in the feature chain is an evaluable condition involving the last feature $f_n$ of a feature vector (e.g., feature $f_4$ in feature vector 400), with the final node of the feature chain comprising an appropriate leaf node (alternatively each leaf node may correspond to a last feature $f_n$ in the feature vector).

In some examples, converting a root-to-leaf path to a corresponding feature chain may include consolidating two or more decision node transitions in the root-to-leaf path into a single feature chain node in a feature chain. For example, consider the root-to-leaf path in decision tree 402 that includes the following decision node transitions: $f_1$ condition 1a to $f_4$ condition 1b to $f_1$ condition 2a to Class 2. Two decision node transitions in this example path occur as a result of evaluating conditions involving feature $f_1$. As such, these two decision node transitions may be consolidated in the single feature chain node associated with feature $f_1$ in the corresponding feature chain 514 (represented as $f_1$ condition 1a+2a). For example, if $f_1$ condition 1a represents $f_1 > x_1$ and if $f_1$ condition 2a represents $f_1 < x_2$, the consolidated result (i.e., $x_1 < f_1 < x_2$) may be represented in the first feature chain node of feature chain 514 (i.e., the feature chain node associated with the feature $f_1$). Consolidating multiple decision node transitions involving a particular feature variable into a single consolidated feature chain node for that feature variable may increase the memory density and reduce the amount of area needed when encoding the set of logical rules represented by decision tree 402 into an aCAM.

The conversion of the example root-to-leaf path involving the sequence of decision node transitions identified above to feature chain 514 involves all of the types of data manipulations described above, specifically, consolidating decision node transitions (combining $f_1$ condition 1a and $f_1$ condition 2a); reordering decision node transitions (moving $f_4$ condition 1b to a position in the node chain 514 that is after the nodes corresponding to features $f_1$, $f_2$, and $f_3$); and including wildcard feature chain nodes values for particular features that do not have evaluable conditions in the corresponding root-to-leaf path (i.e., including wildcard feature chain nodes in feature chain 514 for features $f_2$ and $f_3$). The set of all root-to-leaf paths represented in decision tree 402 may be converted to a corresponding set of feature chains according to the methodology described above.

Once the conversion process is complete and the tabular representation of the domain logic rules is generated, each feature chain in the tabular representation may be rotated and mapped to a respective row of aCAM 616 in FIG. 6. In some examples, the sequence of feature chains in the tabular representation may be dictated by a convention that defines an order in which decision tree 402 is traversed to cover all root-to-leaf paths represented in decision tree 402. Further, in some examples, the sequence of feature chains in the tabular representation may be mapped and encoded to rows of aCAM 616 in the same sequence. In other examples, the sequencing of the feature chains may not be relevant as long as each root-to-leaf node in decision tree 402 is converted to a respective corresponding feature chain, and each feature chain is mapped to and encoded in a respective row of aCAM 616.

As shown in FIG. 6, feature chain 512 may be mapped to and encoded in a particular row of aCAM 616 (e.g., aCAM row N−1). More specifically, each value represented in each feature chain node of feature chain 512 may be stored using a respective corresponding one or more aCAM cells in row N−1. Each other feature chain such as, for example, feature chain 514 may be similarly mapped to and encoded in a respective row of aCAM 616 (not illustrated).

In some examples, the value represented in a feature chain node of feature chain 512 may in fact be a range of values. As previously noted, aCAM 616 provides the capability to store and encode such ranges of values. The number of aCAM cells required to encode the values/ranges of values corresponding to a particular feature (e.g., feature $f_1$) across all feature chains (i.e., the number of aCAM cell columns corresponding to feature $f_1$) may depend on the level of precision required to encode such values/ranges of values. For a feature in feature vector 400 that is a categorical variable that can take on only a limited number of discrete values (e.g., the set of all origin or destination airports), a single column of aCAM cells may be sufficient to represent all stored values for that feature across the set of domain logic rules. On the other hand, for a feature that corresponds to a numeric variable capable of taking on a large number of possible values (e.g., a continuous range of values), multiple columns of aCAM cells may be required to provide the bit precision needed to store such values.

In some examples, an output parameter of each feature chain (domain logic rule) encoded in aCAM 616 may in fact be stored in a memory array separate from aCAM 616. For instance, as illustratively shown in FIG. 4, each of the leaf nodes of decision tree 402 represent classification outputs that may be stored in a random access memory (RAM) 618 separate from aCAM 616 (in some examples RAM 618 may comprise a resistive random access memory (ReRAM)). This may then allow for multiple matches to be returned for a search query. In some examples, a search query may conform to the format of feature vector 400 and may specify a discrete value, a range of values, or a "wildcard" value for each search variable (i.e., each feature in feature vector 400). The search query may then be searched, in parallel, against each row in aCAM 616 to determine if the search query matches the stored values in any such row. Each row of aCAM 616 may represent a stored word that corresponds to a particular feature chain, and thus, a particular root-to-leaf path in decision tree 402. In some examples, a stored word may include only those values stored in a particular row of aCAM 616. In other examples, a stored word may include the values of a particular aCAM row as well as a corresponding value of the output parameter (e.g., the classification output value) stored in RAM 618.

In some examples, the output parameter (e.g., the classification outputs represented by the leaf nodes of decision tree 402) may be a parameter that a user seeks to optimize. For example, a search query may specify a maximum or minimum allowable value for the optimized parameter, in which case, any row in aCAM 616 that matches each of the constrained and/or flexible parameter values specified in the search query and that satisfies the value specified for the optimized parameter may be returned as a match result. More specifically, the address of any such matching row in aCAM 616 may be returned as a search result. Optionally, the corresponding value for the optimized parameter stored in RAM 618 (or the memory address in RAM 618 for the corresponding value) may also be returned.

In other examples, rather than searching for stored rows in aCAM 616 that correspond to output parameter values that are below or above a specified value as part of an optimization process, a search query may instead specify a value for the output parameter that requires an exact match among the values for the output parameter stored in RAM 618. For instance, in such examples, a search query may result in a match only if (1) all other search parameter values specified in the search query match corresponding stored values in a given row of aCAM 616 and (2) the output parameter value specified in the search query exactly matches a value stored in RAM 618 that corresponds to that row in aCAM 616. Thus, in such examples, a search query that includes search variable values that satisfy the first four feature chain nodes of feature chain 512, but that specifies "Class 3" for the output parameter value would not produce a match at stored word N−1.

In still other examples, a search query may specify an exclusionary value for the output parameter. For instance, the search query may specify "Class 2" as an exclusionary value for the output parameter in FIG. 4. Such an example search query would then produce a matching result for any row in aCAM 616, and thus, any feature chain in the tabular representation and corresponding root-to-leaf path in decision tree 402, that matches each of the other constrained parameters in the search query and that corresponds to a stored output parameter value other than "Class 2." This may represent a mechanism for optimizing the output parameter by specifying values to be excluded from matching rather than through iterative adjustment of the optimized parameter.

FIGS. 7A-7C illustrate a comparison between a conventional representation for a decision tree in an aCAM and a representation for the decision tree using a tree-CAM of the presently disclosed technology. Namely, FIG. 7A depicts an example decision tree 702. FIG. 7B depicts an example conventional representation of decision tree 702 in an aCAM 716. FIG. 7C depicts an example representation of decision tree 702 in a tree-CAM 720.

As depicted in FIG. 7A, decision tree 702 includes a set of decision nodes including root decision node 704, intermediate decision nodes 706a and 706b, and leaf nodes 708a-d.

Decision tree 702 includes four root-to-leaf paths: a first root-to-leaf path terminating at leaf node 708a; a second root-to-leaf path terminating at leaf node 708b; a third root-to-leaf path terminating at leaf node 708c; and a fourth root-to-leaf path terminating at leaf node 708d. As alluded to above, each root-to-leaf path represents a traversal of a series of decision nodes in decision tree 702 beginning at root decision node 704, passing through an intermediate decision node, and ending at a leaf node. Each decision node traversed in a given root-to-leaf path may represent a respective evaluable condition involving a corresponding feature of feature vector 700. As such, each root-to-leaf path represents a series of evaluable conditions representative of a logical rule against which a feature vector can be evaluated.

In the example of the first root-to-leaf path of FIG. 7A (i.e., the root-to-leaf path terminating at leaf node 708a), the series of evaluable conditions begins with an evaluable condition at root decision node 704, which is illustratively depicted as involving feature $f_1$ of feature vector 700. Namely, the evaluable condition compares feature $f_1$ of feature vector 700 against a threshold ($T_1$) to determine whether $f_1 < (T_1)$. As depicted, such an evaluation may result in two possible outcomes: (a) $f_1 \geq (T_1)$, which may represent the condition not being satisfied when evaluated; and (b) $f_1 < (T_1)$, which may represent the condition being satisfied when evaluated. In the example of the first root-to-leaf path, the outcome of the evaluation at root decision node 704 is $f_1 \geq (T_1)$, meaning that the first root-to-leaf path traverses to intermediate decision node 706a. At intermediate decision node 706a, the evaluable condition compares feature $f_2$ of feature vector 700 against a threshold ($T_2$) to determine whether $f_2 < (T_2)$. As depicted, such an evaluation may result in two possible outcomes: (a) $f_2 \geq (T_2)$, which may represent the condition not being satisfied when evaluated; and (b) $f_2 < (T_2)$, which may represent the condition being satisfied when evaluated. In the example of the first root-to-leaf path, the outcome of the evaluation at intermediate decision node 706a is $f_2 \geq (T_2)$. Accordingly, the first root-to-leaf path traverses to leaf node 708a, which may represent a classification $L_1$. Here, the other root-to-leaf paths of decision tree 702 may be traversed in the same/similar manner.

Referring now to FIG. 7B, FIG. 7B depicts a conventional representation of decision tree 702 in an aCAM 716. As depicted, aCAM 716 comprises four rows: row 716a; row 716b; row 716c; and row 716d. Each row of aCAM 716 comprises three aCAM cells (e.g., aCAM cell 716a(1)) electrically connected along a match line. Like aCAM cell 100 of FIG. 1, each aCAM cell of aCAM 716 may comprise a lower bound side (e.g., lower bound side 716(1)(i)) comprising a first memristor (not depicted) programmed to store a lower boundary threshold and an upper bound side (e.g., upper bound side 716(1)(ii)) comprising a second memristor (not depicted) programmed to store an upper boundary threshold. In various examples, the aCAM cells of aCAM 716 may comprise the same/similar construction as aCAM cell 100 of FIG. 1, although this need not be the case.

As described above, decision tree 702 can be programmed into the rows of aCAM 716 such that each row of aCAM 716 represents a different root-to-leaf path of decision tree 702. In particular, the first root-to-leaf path of decision tree 702 (i.e., the root-to-leaf path terminating at leaf node 708a) is programmed into row 716a, the second root-to-leaf path of decision tree 702 (i.e., the root-to-leaf path terminating at leaf node 708b) is programmed into row 716b, the third root-to-leaf path of decision tree 702 (i.e., the root-to-leaf path terminating at leaf node 708c) is programmed into row 716c, and the fourth root-to-leaf path of decision tree 702 (i.e., the root-to-leaf path terminating at leaf node 708d) is programmed into row 716d. As depicted, the leaf nodes of decision tree 702 may be programmed into rows of a ReRAM 718 which is electrically connected to the match lines of aCAM 716.

As alluded to above, a feature vector can be applied to the root-to-leaf paths stored in aCAM 716 by applying a series of analog input voltages along the columns of aCAM 716. For example, a first analog input voltage representing feature $f_1$ of feature vector 700 can be applied along the leftmost column of aCAM 716, a second analog input voltage representing feature $f_2$ of feature vector 700 can be applied along the middle column of aCAM 716, and a third analog input voltage representing feature $f_3$ of feature vector 700 can be applied along the rightmost column of aCAM 716. If, for example, row 716a returns a match, that may indicate that feature vector 700 matches the first root-to-leaf path represented by row 716a.

As depicted, aCAM cell 716a(1) may be programmed to represent a first feature chain node (corresponding to feature $f_1$ of feature vector 700) of the first root-to-leaf path. Namely, the lower bound side 716a(1)(i) of aCAM cell 716a(1) is programmed to store threshold ($T_1$), while the upper bound side 716a(1)(ii) of aCAM cell 716a(1) is programmed to a wildcard value (represented by the "X"). In this way, aCAM cell 716a(1) has been programmed to store the evaluable condition $f_1 \geq (T_1)$, which is consistent with the first root-to-leaf path's traversal from root decision node 702 to intermediate decision node 706a. Taking aCAM cell 716d(1) as a contrasting example, the lower bound side 716d(1)(i) of aCAM cell 716d(1) is programmed to a wildcard value (represented by the "X"), while the upper bound side 716d(1)(ii) of aCAM cell 716d(1) is programmed to store threshold ($T_1$). In this way, aCAM cell 716d(1) has been programmed to store the evaluable condition $f_1 < (T_1)$, which is consistent with the fourth root-to-leaf path's traversal from root decision node 702 to intermediate decision node 706b. The other aCAM cells of aCAM 716 have been programmed in a similar manner such that the rows of aCAM 716 represent decision tree 702.

Before describing tree-CAM 720 in conjunction with FIG. 7C, a few things may be noted regarding aCAM 716. For example, the conventional representation for decision tree 702 in aCAM 716 is extremely sparse. Namely, the representation includes four "non-evaluation cells" (i.e., aCAM cells where the upper bound and lower bound thresholds are programmed to wildcard values) accounting for features which are not being evaluated for certain root-to-leaf paths. Relatedly, even the aCAM cells representing "non-wildcard" feature chain nodes (i.e., feature chain nodes representing evaluable conditions involving features which are evaluated in a given root-to-leaf path) include a memristor programmed to a wildcard value. It may also be noted that aCAM cells of different rows (representing different root-to-leaf paths) have been programmed to store the same thresholds. For example, four aCAM cells of the leftmost column of aCAM 716 have been programmed to store threshold ($T_1$). Likewise, two aCAM cells of the middle column have been programmed to store threshold ($T_2$), and two aCAM cells of the rightmost column have been programmed to store threshold ($T_3$). Consequentially, aCAM 716 utilizes 24 memristors: i.e., (two memristors per aCAM cell)×(12 aCAM cells) to represent decision tree 702, which has only 3 thresholds. By contrast (and as will be described in greater detail below), tree-CAM 720 can represent decision tree 702 using just three memristors. Accordingly, tree-CAM 720 can be more compact, consume less power during operation (a significant portion of power consumption during aCAM operation is due to static current flowing through memristors during search operations) and programming (a significant portion of power consumption for aCAM circuits is associated with memristor programming and its associated circuitry), and require less memristor programming time than existing aCAM circuits used to implement decision trees.

Referring now to FIG. 7C, FIG. 7C depicts an example tree-CAM 720 programmed to represent decision tree 702.

Tree-CAM 720 is specially constructed to implement decision tree 702 more efficiently—namely with less hardware (i.e., fewer memristors and transistors), less power consumption, and less memristor programming time than existing aCAMs (e.g., aCAM 716) would use to implement decision tree 702. Tree-CAM 720 realizes these optimizations by leveraging shared comparison sub-circuits (i.e., shared comparison sub-circuits 722, 724, and 726) that each store a threshold shared among evaluable conditions for multiple root-to-leaf paths of decision tree 702. A threshold associated with a given shared comparison sub-circuit (e.g., shared comparison sub-circuit 722) may be evaluated against a feature of feature vector 700 (e.g., feature $f_1$). The given shared comparison sub-circuit may comprise just a single memristor programmed to store the threshold. Accordingly, tree-CAM 720 can represent/implement evaluable conditions (sharing a common threshold and evaluated against a common feature of feature vector 700) across multiple root-to-leaf paths of decision tree 702 with a single memristor—thus reducing the number of memristors required to implement decision tree 702. Relatedly, tree-CAM 720 can eliminate/reduce memristors and other hardware associated with the above-described "non-evaluation cells" that proliferate in existing representations of decision trees in aCAMs (see e.g., FIG. 7B for an example). Accordingly, tree-CAM 720 requires just three memristors (i.e., one memristor associated with each of its three constituent shared comparison sub-circuits) to implement decision tree 702. Thus, tree-CAM 720 can be more compact, consume less power (a significant portion of power consumption for aCAM circuits is associated with memristor programming and its associated circuitry), and require less memristor programming time than existing aCAM circuits used to implement decision tree 702.

As depicted, tree-CAM 720 includes four match lines. Each match line of tree-CAM 720 is associated with a separate root-to-leaf path of decision tree 702. Namely, match line 720a is associated with the first root-to-leaf path of decision tree 702 (i.e., the root-to-leaf path terminating at leaf node 708a), match line 720b is associated with the second root-to-leaf path of decision tree 702 (i.e., the root-to-leaf path terminating at leaf node 708b), match line 720c is associated with the third root-to-leaf path of decision tree 702 (i.e., the root-to-leaf path terminating at leaf node 708c), and match line 720d is associated with the fourth root-to-leaf path of decision tree 702 (i.e., the root-to-leaf path terminating at leaf node 708d). As depicted, the leaf nodes of decision tree 702 may be programmed into rows of a ReRAM 758 which is electrically connected to the match lines of tree-CAM 720. For example, a first row of ReRAM 758 is electrically connected to an output of match line 720a and stores a leaf of the first-root-to-leaf path of decision tree 702. Likewise, a second row of ReRAM 758 is electrically connected to an output of match line 720b and stores a leaf of the second-root-to-leaf path of decision tree 702.

As depicted, tree-CAM 720 includes three shared comparison sub-circuits: (1) shared comparison sub-circuit 722; (2) shared comparison sub-circuit 724; and (3) shared comparison sub-circuit 726. As alluded to above, a shared comparison sub-circuit of tree-CAM 720 may operate to: (a) store a boundary voltage threshold based on a programmed conductance of its constituent memristor, the boundary voltage threshold associated with one or more evaluable conditions involving a feature of feature vector 700; (b) receive an analog input voltage corresponding to the feature; and (c) output a comparison output voltage that comprises a first voltage when the analog input voltage exceeds the stored boundary voltage threshold and a second voltage when the analog input voltage is less than the stored boundary voltage threshold. For example, shared comparison sub-circuit 722 stores the boundary voltage threshold ($T_1$) based on a programmed conductance of its constituent memristor. As alluded to above, the boundary voltage threshold ($T_1$) is evaluated against feature $f_1$ of feature vector 700 in all four root-to-leaf paths of decision tree 702. Accordingly, shared comparison sub-circuit 722 may receive an analog input voltage corresponding to feature $f_1$, and output a comparison output voltage that comprises a first voltage when the analog input voltage corresponding to feature $f_1$ exceeds the stored boundary voltage threshold ($T_1$) and a second voltage when the analog input voltage corresponding to feature $f_1$ is less than the stored boundary voltage threshold ($T_1$). As depicted, shared comparison sub-circuit 724 stores the boundary voltage threshold ($T_2$) based on a programmed conductance of its constituent memristor. As alluded to above, the boundary voltage threshold ($T_2$) is evaluated against feature $f_2$ of feature vector 700 in two root-to-leaf paths of decision tree 702. Accordingly, shared comparison sub-circuit 724 may receive an analog input voltage corresponding to feature $f_2$, and output a comparison output voltage that comprises a first voltage when the analog input voltage corresponding to feature $f_2$ exceeds the stored boundary voltage threshold ($T_2$) and a second voltage when the analog input voltage corresponding to feature $f_2$ is less than the stored boundary voltage threshold ($T_2$). Similarly, shared comparison sub-circuit 726 stores the boundary voltage threshold ($T_3$) based on a programmed conductance of its constituent memristor. As alluded to above, the boundary voltage threshold ($T_3$) is evaluated against feature $f_3$ of feature vector 700 in two root-to-leaf paths of decision tree 702. Accordingly shared comparison sub-circuit 726 may receive an analog input voltage corresponding to feature $f_3$, and output a comparison output voltage that comprises a first voltage when the analog input voltage corresponding to feature $f_3$ exceeds the stored boundary voltage threshold ($T_3$) and a second voltage when the analog input voltage corresponding to feature $f_3$ is less than the stored boundary voltage threshold ($T_3$).

As alluded to above, each shared comparison sub-circuit of tree-CAM 720 may comprise just a single memristor. In various examples, each shared comparison sub-circuit may comprise the same/similar construction as voltage divider sub-circuit 112 of aCAM cell 100. For example, shared comparison sub-circuit 722 may comprise a transistor and a memristor electrically connected to each other in series. The memristor and transistor may define a voltage divider sub-circuit. The voltage divider sub-circuit may receive an analog input voltage corresponding to feature $f_1$, and output a comparison output voltage that comprises a first voltage when the analog input voltage corresponding to feature $f_1$ exceeds the stored boundary voltage threshold ($T_1$) and a second voltage when the analog input voltage corresponding to feature $f_1$ is less than the stored boundary voltage threshold ($T_1$). For example, when the analog input voltage corresponding to feature $f_1$ is greater than or equal to the boundary voltage threshold ($T_1$), the transistor may increase in conductivity causing the voltage across the memristor to drop, resulting in a small comparison output voltage. As described in greater detail below, this small comparison output voltage may not be sufficient to turn-on/activate match line transistors 730a and 730b which are electrically connected to shared comparison sub-circuit 722. Accordingly, match line transistors 730a and 730b may not pull-down the voltage of match lines 720a and 720b respectively, indicating a match between the feature $f_1$ and the first and second root-to-leaf paths of decision tree 702 associated with match lines 720a and 720b respectively. By contrast, the small comparison output voltage may be inverted by voltage inverter 740 before being received by match line transistors 730c and 730d. Accordingly, the inverted comparison output voltage received by match line transistors 730c and 730d may comprise a (large) voltage sufficient to turn-on/activate match line transistors 730c and 730d. Accordingly, match line transistors 730c and 730c may pull-down the voltage of match lines 720c and 720d respectively, indicating a mismatch between the feature $f_1$ and the third and fourth root-to-leaf paths of decision tree 702 associated with match lines 720c and 720d respectively.

As alluded to above, tree-CAM 720 includes eight match line transistors electrically connected between respective shared comparison sub-circuits and respective match lines of tree-CAM 720: (1) match line transistor 730a electrically connected between shared comparison sub-circuit 722 and match line 720a; (2) match line transistor 730b electrically connected between shared comparison sub-circuit 722 and match line 720b; (3) match line transistor 730c electrically connected between shared comparison sub-circuit 722 and match line 720c; (4) match line transistor 730d electrically connected between shared comparison sub-circuit 722 and match line 720d; (5) match line transistor 732a electrically connected between shared comparison sub-circuit 724 and match line 720a; (6) match line transistor 732b electrically connected between shared comparison sub-circuit 724 and match line 720b; (7) match line transistor 734c electrically connected between shared comparison sub-circuit 726 and match line 720c; and (8) match line transistor 730d electrically connected between shared comparison sub-circuit 726 and match line 720d. Tree-CAM 720 also includes three voltage inverters (which may comprise the same/similar construction as inverter 124 of FIG. 1) electrically connected between certain shared comparison sub-circuits and certain match line transistors: (1) voltage inverter 740 electrically connected between shared comparison sub-circuit 722 and match line transistors 730c-d; (2) voltage inverter 742 electrically connected between shared comparison sub-circuit 724 and match line transistors 732b; and (3) voltage inverter 744 electrically connected between shared comparison sub-circuit 726 and match line transistors 734d.

Here, the combination of shared comparison sub-circuit 722 and match line transistor 730a may implement the evaluable condition $f_1 \geq (T_1)$. Likewise, the combination of shared comparison sub-circuit 722 and match line transistor 730b may also implement the evaluable condition $f_1 \geq (T_1)$. Accordingly, the boundary voltage threshold $(T_1)$ may comprise a lower boundary threshold for the evaluable conditions involving the feature $f_1$ for the first and second root-to-leaf paths. By contrast, because voltage inverter 740 is electrically connected between shared comparison sub-circuit 722 and match line transistor 730c, the combination of shared comparison sub-circuit 722, voltage inverter 740, and match line transistor 730c may implement the evaluable condition $f_1 < (T_1)$. Likewise, the combination of shared comparison sub-circuit 722, voltage inverter 740, and match line transistor 730d may also implement the evaluable condition $f_1 < (T_1)$. Accordingly, the boundary voltage threshold $(T_1)$ may comprise an upper boundary threshold for the evaluable conditions involving the feature $f_1$ for the third and fourth root-to-leaf paths. Accordingly, a first comparison output voltage (e.g., a low voltage) output from shared comparison sub-circuit 722 may realize a match condition at match lines 720a and 720b (electrically connected to match line transistors 730a and 730b respectively) and a mismatch condition at match lines 720c and 720d (electrically connected to match line transistors 730c and 730d respectively). Conversely, a second comparison output voltage (e.g., a high voltage) output from shared comparison sub-circuit 722 may realize a match condition at match lines 720c and 720d (electrically connected to match line transistors 730c and 730d respectively) and a mismatch condition at match lines 720a and 720b (electrically connected to match line transistors 730a and 730b respectively). Again, this logic can be implemented using just a single memristor of shared comparison sub-circuit 722.

According to the above-described principles, the combination of shared comparison sub-circuit 724 and match line transistor 732a may implement the evaluable condition $f_2 \geq (T_2)$. Accordingly, the boundary voltage threshold $(T_2)$ may comprise a lower boundary threshold for the evaluable condition involving the feature $f_2$ for the first root-to-leaf path. By contrast, because voltage inverter 742 is electrically connected between shared comparison sub-circuit 724 and match line transistor 732b, the combination of shared comparison sub-circuit 724, voltage inverter 742, and match line transistor 732b may implement the evaluable condition $f_2 < (T_2)$. Accordingly, the boundary voltage threshold $(T_2)$ may comprise an upper boundary threshold for the evaluable condition involving the feature $f_2$ for the second root-to-leaf path Notably, no match line transistors are electrically connected between shared comparison sub-circuit 724 and match line 720c or match line 720d. As alluded to above, this is because the third and fourth root-to-leaf paths (associated with match line 720c and match line 720d respectively) do not include evaluable conditions involving the feature $f_2$. As described in conjunction with FIG. 7B, in conventional representations of decision trees in aCAMs, such non-evaluation is accounted for using "non-evaluation" cells (typically comprising two memristors and as many as 6 transistors) programmed to wildcard values. By contrast however, tree-CAM 720 is specially designed to eliminate such "non-evaluation" cells, realizing further reductions in memristor hardware and associated circuitry. In other words, if a given root-to-leaf path of a decision tree does not include an evaluable condition involving a feature, tree-CAM simply does not include a match line transistor electrically connected between a shared comparison sub-circuit associated with the feature and a match line associated with the given root-to-leaf path.

According to the above-described principles, the combination of shared comparison sub-circuit 726 and match line transistor 734c may implement the evaluable condition $f_3 \geq (T_3)$. Accordingly, the boundary voltage threshold $(T_3)$ may comprise a lower boundary threshold for the evaluable condition involving the feature $f_3$ for the third root-to-leaf path. By contrast, because voltage inverter 744 is electrically connected between shared comparison sub-circuit 726 and match line transistor 734d, the combination of shared comparison sub-circuit 726, voltage inverter 744, and match line transistor 734d may implement the evaluable condition $f_3 < (T_3)$. Accordingly, the boundary voltage threshold $(T_3)$ may comprise an upper boundary threshold for the evaluable condition involving the feature $f_s$ for the fourth root-to-leaf path. No match line transistors are electrically connected between shared comparison sub-circuit 726 and match line 720a or match line 720b. As alluded to above, this is because the first and second root-to-leaf paths (associated with match line 720a and match line 720b respectively) do not include evaluable conditions involving the feature $f_3$.

FIGS. 8A-8B respectively depict an example decision tree 802 and an example representation of the decision tree in a tree-CAM 820, in accordance with examples of the presently disclosed technology.

Here, decision tree 802 may be an example of an "oblivious tree"—which is a special type of decision tree where each decision node of a given level performs the same comparison. As depicted, tree-CAM 820 (in combination with ReRAM 858) can implement/represent decision tree 802 in a highly efficient manner. Namely, tree-CAM 820 can implement decision tree 802 with just two memristors—associated with shared comparison sub-circuits 822 and 824 respectively.

FIG. 9 depicts a block diagram of an example computer system 900 in which various of the examples described herein may be implemented.

The computer system 900 includes a bus 912 or other communication mechanism for communicating information, one or more hardware processors 904 coupled with bus 912 for processing information. Hardware processor(s) 904 may be, for example, one or more general purpose microprocessors.

The computer system 900 also includes a main memory 906, such as a random access memory (RAM), cache and/or other dynamic storage devices, coupled to bus 912 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 912 or other static storage device coupled to bus 912 for storing static information and instructions for processor 904. A storage device 914, such as a magnetic disk, optical disk, or USB thumb drive (Flash drive), etc., is provided and coupled to bus 912 for storing information and instructions.

Computer system 900 additionally includes hardware accelerator 908. Hardware accelerator 908 may be configured to execute instructions (i.e. programming or software code) stored in the main memory 906, read-only memory (ROM) 912, and/or storage device 914 to encode a set of logical rules embodied in a data structure (e.g., a decision tree) into an treeCAM array 910. In an example implementation, the exemplary hardware accelerator 908 may include multiple integrated circuits, which in turn, can include Application-Specific Integrated Circuits (ASICs), Field Programmable Gate Arrays (FPGAs) or other Very Large Scale Integrated circuits (VLSIs). The integrated circuits of the exemplary hardware accelerator 908 may be specifically optimized to perform a discrete subset of computer processing operations, or execute a discrete subset of computer-executable instructions, in an accelerated manner. For example, hardware accelerator 908 may be configured or manufactured to implement a set of logical rules embodied in a data structure such as the decision tree on the treeCAM array 910.

The treeCAM array 910 may include a non-volatile memory built using technologies that include for instance, resistive switching memory (i.e. memristor), phase change memory, magneto-resistive memory, ferroelectric memory, some other resistive random access memory device (ReRAM), or combinations of those technologies. More generally, the treeCAM array 910 may be implemented using technologies that permit the treeCAM array 910 to hold its contents even when power is lost or otherwise removed. Thus, data in the treeCAM array 910 "persists" and the treeCAM array 910 can act as what is known as a "non-volatile memory."

The computer system 900 may be coupled via bus 912 to a display 916, such as a liquid crystal display (LCD) (or touch screen), for displaying information to a computer user. An input device 918, including alphanumeric and other keys, is coupled to bus 912 for communicating information and command selections to processor 904. Another type of user input device is cursor control 920, such as a mouse, a trackball, or cursor direction keys for communicating direction information and command selections to processor 904 and for controlling cursor movement on display 916. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 914. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 914. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 912. Transmission media can also take the form of acoustic or light waves, such as those generated during radio-wave and infra-red data communications.

The computer system 900 also includes a communication/network interface 922 coupled to bus 912. Network interface 922 provides a two-way data communication coupling to one or more network links that are connected to one or more local networks. For example, communication interface 922 may be an integrated services digital network (ISDN) card, cable modem, satellite modem, or a modem to provide a data communication connection to a corresponding type of telephone line. As another example, network interface 922 may be a local area network (LAN) card to provide a data communication connection to a compatible LAN (or WAN component to communicated with a WAN). Wireless links may also be implemented. In any such implementation, network interface 918 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 922, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 922.

The received code may be executed by processor 904 as it is received, and/or stored in storage device 914, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A circuit comprising:
a first match line associated with a first root-to-leaf path of a decision tree;
a second match line associated with a second root-to-leaf path of the decision tree;
a shared comparison sub-circuit comprising a memristor selectively connected to the first and second match lines, wherein the shared comparison sub-circuit:
stores a boundary voltage threshold based on a programmed conductance of the memristor, the boundary voltage threshold associated with one or more evaluable conditions involving a feature of a feature vector;
receives an analog input voltage corresponding to the feature,
outputs a comparison output voltage that comprises a first voltage when the analog input voltage exceeds the stored boundary voltage threshold and a second voltage when the analog input voltage is less than the stored boundary voltage threshold;
a first match line transistor that selectively modifies voltage of the first match line based on the comparison output voltage; and
a second match line transistor that selectively modifies voltage of the second match line based on the comparison output voltage.

2. The circuit of claim 1, further comprising a third match line associated with a third root-to-leaf path of the decision tree, wherein:
the first root-to-leaf path includes an evaluable condition involving the feature;
the second root-to-leaf path includes an evaluable condition involving the feature;
the third root-to-leaf path does not include an evaluable condition involving the feature; and
among the first-third match lines, only the first and second match lines are electrically connected to the shared comparison sub-circuit.

3. The circuit of claim 2, further comprising:
a second shared comparison sub-circuit comprising a second memristor, wherein the second shared comparison sub-circuit:
stores a second boundary voltage threshold based on a programmed conductance of the second memristor, the second boundary voltage threshold associated with one or more evaluable conditions involving a second feature of the feature vector,
receives a second analog input voltage corresponding to the second feature,
outputs a second comparison output voltage that comprises a first voltage when the second analog input voltage exceeds the second stored boundary voltage threshold and a second voltage when the second analog input voltage is less than the second stored boundary voltage threshold;
a third match line transistor that selectively modifies voltage of the first match line based on the second comparison output voltage; and
a fourth match line transistor that selectively modifies voltage of the third match line based on the second comparison output voltage.

4. The circuit of claim 3, wherein:
the first root-to-leaf path includes an evaluable condition involving the second feature; and
the second root-to-leaf path does not include an evaluable condition involving the second feature;
the third root-to-leaf path includes an evaluable condition involving the second feature; and
among the first-third match lines, only the first and third match lines are electrically connected to the second shared comparison sub-circuit.

5. The circuit of claim 1, wherein:
the boundary voltage threshold is associated with a lower boundary threshold for an evaluable condition involving the feature for the first root-to-leaf path; and
the boundary voltage threshold is associated with an upper boundary threshold for an evaluable condition involving the feature for the second root-to-leaf path.

6. The circuit of claim 5, further comprising a voltage inverter electrically connected between the shared comparison sub-circuit and the second match line transistor, wherein the voltage inverter inverts the comparison output voltage such that the second match line transistor receives the inverted comparison output voltage.

7. The circuit of claim 1, further comprising a resistive random-access memory (ReRAM) that stores leaves of the decision tree.

8. The circuit of claim 7, wherein:
a first row of the ReRAM is electrically connected to an output of the first match line and stores a leaf of the first root-to-leaf path; and
a second row of the ReRAM is electrically connected to an output of the second match line and stores a leaf of the second root-to-leaf path.

9. A circuit comprising:
a first match line associated with a first root-to-leaf path of a decision tree;
a second match line associated with a second root-to-leaf path of the decision tree;
a shared comparison sub-circuit comprising a memristor selectively connected to the first and second match lines, wherein the shared comparison sub-circuit:
stores a boundary voltage threshold based on a programmed conductance of the memristor, the boundary voltage threshold associated with one or more evaluable conditions involving a feature of a feature vector;
receives an analog input voltage corresponding to the feature,
outputs a comparison output voltage that comprises a first voltage when the analog input voltage exceeds the stored boundary voltage threshold and a second voltage when the analog input voltage is less than the stored boundary voltage threshold;
a first match line transistor that selectively modifies voltage of the first match line based on the comparison output voltage;
a voltage inverter electrically connected between the shared comparison sub-circuit and a second match line transistor, wherein the voltage inverter inverts the comparison output voltage; and
the second match line transistor that selectively modifies voltage of the second match line based on the inverted comparison output voltage.

10. The circuit of claim 9, wherein:
the boundary voltage threshold is associated with a lower boundary threshold for an evaluable condition involving the feature for the first root-to-leaf path; and
the boundary voltage threshold is associated with an upper boundary threshold for an evaluable condition involving the feature for the second root-to-leaf path.

11. The circuit of claim 9, further comprising a third match line associated with a third root-to-leaf path of the decision tree, wherein:
the first root-to-leaf path includes an evaluable condition involving the feature;
the second root-to-leaf path includes an evaluable condition involving the feature;
the third root-to-leaf path does not include an evaluable condition involving the feature; and
among the first-third match lines, only the first and second match lines are electrically connected to the shared comparison sub-circuit.

12. The circuit of claim 11, further comprising:
a second shared comparison sub-circuit comprising a second memristor, wherein the second shared comparison sub-circuit:
stores a second boundary voltage threshold based on a programmed conductance of the second memristor, the second boundary voltage threshold associated with one or more evaluable conditions involving a second feature of the feature vector,
receives a second analog input voltage corresponding to the second feature,
outputs a second comparison output voltage that comprises a first voltage when the second analog input voltage exceeds the second stored boundary voltage threshold and a second voltage when the second analog input voltage is less than the second stored boundary voltage threshold;
a third match line transistor that selectively modifies voltage of the first match line based on the second comparison output voltage; and
a fourth match line transistor that selectively modifies voltage of the third match line based on the second comparison output voltage.

13. The circuit of claim 12, wherein:
the first root-to-leaf path includes an evaluable condition involving the second feature; and
the second root-to-leaf path does not include an evaluable condition involving the second feature;
the third root-to-leaf path includes an evaluable condition involving the second feature; and
among the first-third match lines, only the first and third match lines are electrically connected to the second shared comparison sub-circuit.

14. The circuit of claim 9, further comprising a resistive random-access memory (ReRAM) that stores leaves of the decision tree, and wherein:
a first row of the ReRAM is electrically connected to an output of the first match line and stores a leaf of the first root-to-leaf path; and
a second row of the ReRAM is electrically connected to an output of the second match line and stores a leaf of the second root-to-leaf path.

15. A circuit comprising:
a first match line associated with a first root-to-leaf path of a decision tree;
a second match line associated with a second root-to-leaf path of the decision tree;
a third match line associated with a third root-to-leaf path of the decision tree;
a shared comparison sub-circuit comprising a memristor selectively connected to the first and second match lines, wherein the shared comparison sub-circuit:
stores a boundary voltage threshold based on a programmed conductance of the memristor, the boundary voltage threshold associated with one or more evaluable conditions involving a feature of a feature vector;
receives an analog input voltage corresponding to the feature,
outputs a comparison output voltage that comprises a first voltage when the analog input voltage exceeds the stored boundary voltage threshold and a second voltage when the analog input voltage is less than the stored boundary voltage threshold;
a first match line transistor that selectively modifies voltage of the first match line based on the comparison output voltage; and
a second match line transistor that selectively modifies voltage of the second match line based on the comparison output voltage;
wherein:
the first root-to-leaf path includes an evaluable condition involving the feature;
the second root-to-leaf path includes an evaluable condition involving the feature;
the third root-to-leaf path does not include an evaluable condition involving the feature; and
among the first-third match lines, only the first and second match lines are electrically connected to the shared comparison sub-circuit.

16. The circuit of claim 15, further comprising:
a second shared comparison sub-circuit comprising a second memristor, wherein the second shared comparison sub-circuit:
stores a second boundary voltage threshold based on a programmed conductance of the second memristor, the second boundary voltage threshold associated with one or more evaluable conditions involving a second feature of the feature vector,
receives a second analog input voltage corresponding to the second feature,
outputs a second comparison output voltage that comprises a first voltage when the second analog input voltage exceeds the second stored boundary voltage threshold and a second voltage when the second analog input voltage is less than the second stored boundary voltage threshold;
a third match line transistor that selectively modifies voltage of the first match line based on the second comparison output voltage; and
a fourth match line transistor that selectively modifies voltage of the third match line based on the second comparison output voltage.

17. The circuit of claim 16, wherein:
the first root-to-leaf path includes an evaluable condition involving the second feature; and
the second root-to-leaf path does not include an evaluable condition involving the second feature;
the third root-to-leaf path includes an evaluable condition involving the second feature; and
among the first-third match lines, only the first and third match lines are electrically connected to the second shared comparison sub-circuit.

18. The circuit of claim 15, wherein:
- the boundary voltage threshold is associated with a lower boundary threshold for an evaluable condition involving the feature for the first root-to-leaf path; and
- the boundary voltage threshold is associated with an upper boundary threshold for an evaluable condition involving the feature for the second root-to-leaf path.

19. The circuit of claim 18, further comprising a voltage inverter electrically connected between the shared comparison sub-circuit and the second match line transistor, wherein the voltage inverter inverts the comparison output voltage such that the second match line transistor receives the inverted comparison output voltage.

20. The circuit of claim 1, wherein the first match line transistor is connected between the first match line and the shared comparison sub-circuit, and wherein the second match line transistor is connected between the second match line and the shared comparison sub-circuit.

* * * * *